United States Patent
Hamai et al.

(10) Patent No.: US 8,519,028 B2
(45) Date of Patent: Aug. 27, 2013

(54) EARLY STRENGTHENING AGENT FOR HYDRAULIC COMPOSITION

(75) Inventors: Toshimasa Hamai, Wakayama (JP); Masaaki Shimoda, Wakayama (JP); Makoto Ohkubo, Wakayama (JP); Takao Taniguchi, Wakayama (JP); Hiroshi Danjo, Wakayama (JP); Nobuyoshi Suzuki, Wakayama (JP)

(73) Assignee: Kao Corporation, Tokyo (JP)

( * ) Notice: Subject to any disclaimer, the term of this patent is extended or adjusted under 35 U.S.C. 154(b) by 263 days.

(21) Appl. No.: 12/920,961

(22) PCT Filed: Mar. 26, 2009

(86) PCT No.: PCT/JP2009/056842
§ 371 (c)(1),
(2), (4) Date: Oct. 6, 2010

(87) PCT Pub. No.: WO2009/119897
PCT Pub. Date: Oct. 1, 2009

(65) Prior Publication Data
US 2011/0021667 A1    Jan. 27, 2011

(30) Foreign Application Priority Data
Mar. 26, 2008   (JP) .................................. 2008-080769

(51) Int. Cl.
*C08K 3/00*      (2006.01)
*C08K 5/06*      (2006.01)
*C04B 24/26*     (2006.01)
*C08F 30/02*     (2006.01)

(52) U.S. Cl.
USPC ................ 524/2; 524/3; 524/377; 524/547; 526/274; 526/277

(58) Field of Classification Search
USPC ............... 526/274, 277, 374; 524/2, 3, 547, 524/377
See application file for complete search history.

(56) References Cited

U.S. PATENT DOCUMENTS 7,964,682 B2 *  6/2011  Shimoda et al. ............. 526/274
8,143,332 B2 *  3/2012  Shimoda et al. ............. 524/3
2006/0249056 A1 * 11/2006  Shiba et al. .................. 106/819
2006/0293417 A1  12/2006  Taniguchi et al.
2007/0095256 A1   5/2007  Miyagawa et al.

FOREIGN PATENT DOCUMENTS

| EP | 1 767 504 A1 | 3/2007 |
|---|---|---|
| JP | 6-171996 A | 6/1994 |
| JP | 7-215746 A | 8/1995 |
| JP | 11-157898 A | 6/1999 |
| JP | 11-180747 A | 7/1999 |
| JP | 2000-281403 A | 10/2000 |
| JP | 2000-281413 A | 10/2000 |
| JP | 2001-294466 A | 10/2001 |
| JP | 2001284466 A * | 10/2001 |
| JP | 2001294466 A * | 10/2001 |
| JP | 2002-179448 A | 6/2002 |
| JP | 2004-2175 A | 1/2004 |
| JP | 2006-27995 A | 2/2006 |
| JP | 2006-52381 A | 2/2006 |
| JP | 2006-282414 A | 10/2006 |
| JP | 2007-77008 A | 3/2007 |
| JP | 2007-131520 A | 5/2007 |
| JP | 2007-153638 A | 6/2007 |
| JP | 2007-186387 A | 7/2007 |
| JP | 2007-210877 A | 8/2007 |

OTHER PUBLICATIONS

International Search Report PCT/JP2009/056842 dated May 12, 2009.
International Search Report, dated Jul. 7, 2009, for PCT Application No. PCT/JP2009/056834.
English translation of International Preliminary Report on Patentability (Form PCT/IB/373) and Written Opinion of the International Searching Authority (Form PCT/ISA/237) issued on Nov. 9, 2010 in PCT/JP2009/056834.
English translation of International Preliminary Report on Patentability (Form PCT/IB/373) and Written Opinion of the International Searching Authority (Form PCT/ISA/237) issued on Nov. 9, 2010 in PCT/JP2009/056842.

* cited by examiner

*Primary Examiner* — Michael M Bernshteyn
(74) *Attorney, Agent, or Firm* — Birch, Stewart, Kolasch & Birch, LLP

(57) ABSTRACT

This invention relates to an early strengthening agent for a hydraulic composition, which contains a compound (A) selected from a specific glycol ether-based compound and a specific glycerin derivate-based compound, as well as an additive composition for a hydraulic composition, which contains the early strengthening agent and a specific phosphate polymer (B).

10 Claims, 1 Drawing Sheet

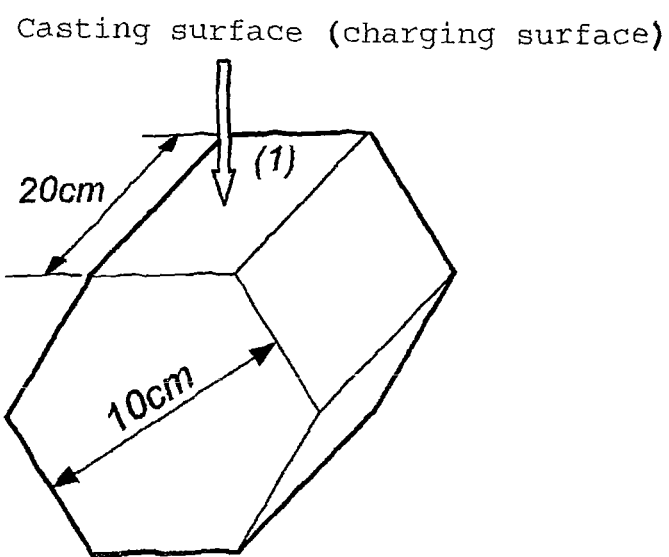

EARLY STRENGTHENING AGENT FOR HYDRAULIC COMPOSITION

FIELD OF THE INVENTION

The present invention relates to an early strengthening agent for a hydraulic composition, an additive composition for a hydraulic composition, and a hydraulic composition.

BACKGROUND OF THE INVENTION

A concrete product is produced via a process which involves kneading materials such as cement, aggregate, water and a dispersant (water-reducing agent), casting (filling) the resulting mixture into various forms and curing it. Realization of high strength in an initial material is important from the viewpoint of productivity (improvement in turnover of mold form), and for this purpose, measures are taken wherein for example, early-strength cement is used, various polycarboxylic acid compounds are used as an admixture to reduce the amount of water in cement compositions, and steam curing is carried out as a curing method. Because of desire for higher productivity, etc. at present, there may be demand for further reduction in the curing process, and realization of high strength (initial strength) in a curing period of 1 day or so may be required. Usually, complicated steps such as a step of heating with steam are incorporated into the curing process, but measures for improving initial strength by design changes in these steps serve hardly as practical means. From the viewpoint of production costs, etc., therefore, there is an earnest desire in the market for a method of obtaining concrete of high initial strength easily without involving changes in the process.

If voids and hollows considered attributable to insufficient filling are generated on the surface of a concrete product upon removal from a form (demolding) after the curing step and the texture of concrete surface is deteriorated due to other various factors, then the quality of the product is lowered. At present, concrete products having deteriorated surface texture are repaired manually after demolding. However, this operation requires many manpowers and much time and is thus regarded as one reason for increasing manufacturing costs. A variety of influencing factors on the surface texture of concrete products are known, among which (1) the amount and quality of voids generated during kneading, (2) the strength of concrete at the time of demolding and (3) concrete viscosity are said to be important factors.

Japanese Patent Application Laid-Open (JP-A) No. 2004-2175 proposes use of an admixture containing a polycarboxylic acid polymer and a polyhydric alcohol/alkylene oxide adduct to provide a cement composition with viscosity to facilitate operation. JP-A No. 2006-282414 discloses a strength enhancer for cement, which contains glycerin or a glycerin derivative and a specific polycarboxylic acid copolymer. JP-A No. 2001-294466 discloses an admixture for a hydraulic composition, which contains a specific shrinkage-reducing agent and a specific antifoaming agent. JP-A No. 2006-52381 discloses, as a high-performance water reducing agent, a phosphate polymer capable of producing low-viscosity concrete. JP-A No. 2007-77008 discloses a surface texture improver containing a specific amide compound and shows a specific polyoxyalkylene compound as a compound used in combination.

SUMMARY OF THE INVENTION

The present invention relates to an early strengthening agent for a hydraulic composition, containing one or more compounds (A) selected from:

a compound represented by the following general formula (A1):

wherein R represents a hydrogen atom, a methyl group or an ethyl group, and Z represents —OH or —O—$CH_2CH_2$—OH, a compound represented by the following general formula (A2):

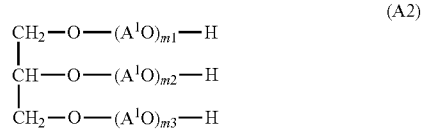

wherein $A^1$ represents an alkylene group having 2 to 4 carbon atoms, m1, m2 and m3 each represent an integer indicating the number of moles of $A^1O$ added and the average of the sum in total of m1, m2 and m3 in the compound represented by the general formula (A2) is 0.5 to 3, and a compound represented by the following general formula (A3):

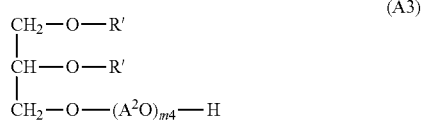

wherein R's may be the same as or different from one another and each represent a hydrogen atom or a group selected from a methyl group, an ethyl group and a propyl group, at least one of R's is group selected from a methyl group, an ethyl group and a propyl group; and $A^2$ represents an alkylene group having 2 to 4 carbon atoms, and m4 is a number of 0 to 2 that is the average number of moles of $A^2O$ added.

The present invention also relates to an additive composition for a hydraulic composition, containing:
the early strengthening agent of the invention, and
a phosphate polymer (B), obtained by copolymerizing, at pH 7 or less,
a monomer 1 represented by the following general formula (B1):

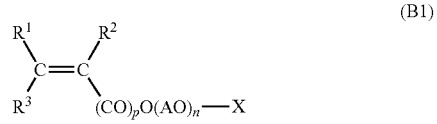

wherein $R^1$ and $R^2$ each independently represent a hydrogen atom or a methyl group, $R^3$ represents a hydrogen atom or —COO(AO)$_n$X, AO represents a oxyalkylene group having 2 to 4 carbon atoms or an oxystyrene group, p is a number of 0 or 1, n is a number of 3 to 200 indicating the average number of moles of AO added, and X represents a hydrogen atom or an alkyl group having 1 to 18 carbon atoms, a monomer 2 represented by the following general formula (B2):

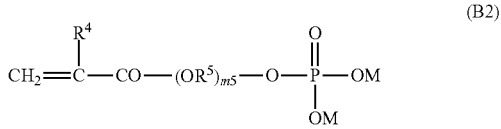

wherein $R^4$ represent a hydrogen atom or a methyl group, $R^5$ represents an alkylene group having 2 to 12 carbon atoms, m5 represents a number of 1 to 30, and M represents a hydrogen atom, an alkali metal or an alkaline earth metal (½ atom), and a monomer 3 represented by the following general formula (B3):

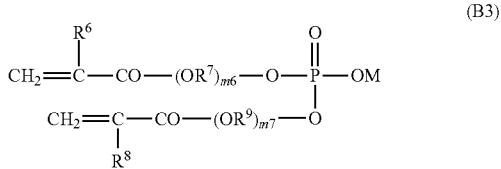

wherein $R^6$ and $R^8$ each independently represent a hydrogen atom or a methyl group, $R^7$ and $R^9$ each independently represent an alkylene group having 2 to 12 carbon atoms, m6 and m7 each independently represent a number of 1 to 30, and M represents a hydrogen atom, an alkali metal or an alkaline earth metal (½ atom).

Further, the present invention relates to a hydraulic composition containing the above shown invention early strengthening agent or an additive composition for a hydraulic composition in the present invention, a hydraulic powder, aggregate and water.

DETAILED DESCRIPTION OF THE INVENTION

The present invention provides an early strengthening agent or an additive composition for a hydraulic composition which improves strength more rapidly, that is, improves early strengthening property, as well as an additive composition for a hydraulic composition capable of giving a cured product (for example, a concrete product) of a hydraulic composition which not only achieves improvement of strength in a short time but is also excellent in surface texture. JP-A No. 2006-282414 supra describes that an initial material exhibits high strength, but specifically a material is merely cured in air and measured for its strength on $7^{th}$ day. From such disclosure of JP-A No. 2006-282414, those skilled in the art can, in general knowledge in the art, not perceive knowledge related to further improvement in strength in a short time, for example to improvement in strength in 1 day or so by steam curing.

According to the invention, there is provided an early strengthening agent for a hydraulic composition which improves strength in a short time, that is, early strengthening property, as well as an additive composition using the same. When the early strengthening agent of the present invention is used, early strengthening property can be improved to reduce the curing time, thereby reducing the operation time, and when the phosphate polymer (B) is used in combination with the early strengthening agent, the surface texture of concrete products after demolding can be significantly improved to reduce the repair operation, thus leading to reduction in production costs. That is, when the early strengthening agent of the present invention is used, a cured product of a hydraulic composition having high early strength can be obtained thus reducing the curing time and improving productivity. The phosphate polymer (B) when used in combination with the early strengthening agent of the present invention yields cured products excellent in surface texture, which is advantageous to quality and workability. In addition, such effects can be easily obtained without particular change in facilities and process.

<Component (A)>

The component (A) is at least one compound selected from the compound represented by the general formula (A1), the compound represented by the general formula (A2) and the compound represented by the general formula (A3). The component (A) is a component (early strengthening agent) contributing to improvement in early strengthening property.

In the general formula (A1), R is a hydrogen atom, a methyl group or an ethyl group, and Z is —OH or —O—CH$_2$CH$_2$—OH. The compound of the general formula (A1) includes ethylene glycol, diethylene glycol, 1,2-propanediol, 1,2-butanediol, etc., among which diethylene glycol is preferable from the viewpoint of improving early strengthening property.

In the general formula (A2), $A^1$O is an oxyalkylene group having 2 to 4 carbon atoms; that is, $A^1$ is an alkylene group having 2 to 4 carbon atoms, such as an ethylene group, a propylene group or a butylene group. $A^1$ is preferably an alkylene group having 2 to 3 carbon atoms, more preferably an alkylene group having 2 carbon atoms.

In the general formula (A2), m1, m2 and m3 each represent an integer indicative of the number of moles of $A^1$O added. The integer is 0 or 1 or more. The average of the sum in total (m1+m2+m3) of m1, m2 and m3 in the compound represented by the general formula (A2) [hereinafter, also referred to as compound (A2)] is 0.5 to 3.0, more preferably 0.5 to 2.5, more preferably 0.5 to 2, even more preferably 0.5 to 1.5, from the viewpoint of improving early strengthening property. The average of the sum in total (m1+m2+m3) of m1, m2 and m3 means the value of the sum in total of m1, m2 and m3 in the compounds of the general formula (A2) that is averaged with the content (weight) of the compounds as a mixture of the general formula (A2) For example, in the case of a mixture of 60% by weight of the compound wherein m1=1 and m2=m3=0 and 40% by weight of the compound wherein m1=m2=m3=0, the sum in total of m1, m2 and m3 in the former compound is 1, and the sum in total of m1, m2 and m3 in the latter compound is 0, and so the average of the sum in total (m1+m2+m3) of m1, m2 and m3 is (1×0.6+0×0.4)=0.6. In calculation of the average of the sum in total of m1, m2 and m3 in the compound (A2) in the present invention, however, all the compounds (glycerin adducts in which 4 moles or more of alkylene oxide were added) wherein the sum in total of m1, m2 and m3 is 4 or more shall be treated as the compound wherein the sum in total of m1, m2 and m3 is 4.

The compound of the general formula (A2) can be obtained as a mixture of glycerin and the glycerin adducts in which alkylene oxide was added (the glycerin adduct in which 1 mole of alkylene oxide was added, the adduct in which 2 moles of alkylene oxide was added, and the glycerin adducts in which 3 moles or more of alkylene oxide were added). The mixture preferably contains the glycerin adducts in which 1 to 3 moles of alkylene oxide were added (the compounds of the general formula (A2) wherein the sum in total of m1, m2 and m3 is an integer of 1 to 3). From the viewpoint of early strengthening property and production costs, the proportion of the compounds of the general formula (A2) wherein the sum in total of m1, m2 and m3 is an integer of 1 to 3, is preferably 35% by weight or more in the mixture of the compounds of the general formula (A2), more preferably 40% by weight or more, even more preferably 50 to 100% by weight, and even more preferably 60 to 100% by weight. From the viewpoint of early strengthening property, the proportion, in the mixture, of the glycerin adduct in which 1 mole of alkylene oxide was added is preferably 20 to 100% by weight, more preferably 30 to 100% by weight, even more preferably 40 to 100% by weight, and even more preferably 50 to 100% by weight. From the viewpoint of both early strengthening property and production costs, the proportion of the glycerin adduct in which 1 mole of alkylene oxide was added is preferably 10% by weight or more, more preferably 20 to 100% by weight, even more preferably 20 to 60% by weight, and even more preferably 20 to 40% by weight. The proportion of the glycerin adduct in which 2 moles of alkylene oxide were added is preferably 5% by weight or more, more preferably 10 to 30% by weight. The proportion of the glycerin adduct in which 3 moles of alkylene oxide were added is preferably 0 to 25% by weight, more preferably 0 to 10% by weight. From the viewpoint of early strengthening property, the proportion of glycerin (adduct in which 0 mole of alkylene oxide is added) in the mixture is preferably 0 to 60% by weight, more preferably 0 to 40% by weight and even more preferably 0 to 20% by weight, and from the viewpoint of surface texture, the proportion of the glycerin adducts in which 4 moles or more of alkylene oxide were added is preferably 0 to 30% by weight, more preferably 0 to 15% by weight and even more preferably 0 to 5% by weight. From the viewpoint of early strengthening property and surface texture, the total proportion of glycerin and the glycerin adducts in which 4 moles or more of alkylene oxide were added is 60% by weight or less, more preferably 50% by weight or less, even more preferably 40% by weight or less.

The mixture of compounds (A2) may be used as component (A). In this case, the sum in total of m1, m2 and m3 is 0.5 to 3 on the average. The average of the sum in total of m1, m2 and m3 of the mixture can be calculated according to the above mentioned method for the compounds (A2). Preferable ranges of the average of the sum in total of m1, m2 and m3 of the mixture are applied according to those of the compounds (A2). Then component (A) may include compounds where the average of m1, m2 and m3 fall within the above mentioned range and no distribution appears in the added mole number, a mixture of compounds, for example, having the sum in total of m1, m2 and m3 of 1 or 2 or 3.

In the present invention, a mixture of compounds (A2) includes a compound of the general formula (A2) wherein the sum in total of m1, m2 and m3 is an integer of 1 to 3. That is, the mixture includes the compound of the general formula (A2) wherein the sum in total of m1, m2 and m3 is 1, 2 or 3 alone or in a mixture.

By changing the type of a catalyst and regulating the reaction conditions in producing the compound (A2), a mixture in which the compounds (A2) different in the number of moles of alkylene oxide added are distributed in different ratios can be produced. For example, the glycerin adduct in which 1 mole of alkylene oxide was added and then a mixture wherein glycerin and the glycerin adducts (that is, the glycerin adducts in which 1, 2, 3, 4 or more of alkylene oxide were added) are present in different ratios, can be obtained by changing the type of a catalyst and the reaction conditions. The average number of moles of alkylene oxide added can be regulated, depending on the molar ratio of glycerin to alkylene oxide used in the reaction. When the molar ratio of alkylene oxide to glycerin is increased, the average number of moles of alkylene oxide added is increased, while when the molar ratio is decreased, the average number of moles of alkylene oxide added is decreased.

The acid catalyst that can be used in production of the mixture of compounds (A2) includes Lewis acids and Friedel-Crafts catalysts, and typical examples include an ether complex of boron trifluoride, tin tetrachloride, indium chloride, and metal perfluoroalkylsulfonates such as lanthanum trifluoromethanesulfonate, lanthanum pentafluoromethanesulfonate, yttrium trifluoromethanesulfonate, yttrium pentafluoromethanesulfonate, zinc trifluoromethanesulfonate, zinc pentafluoromethanesulfonate, copper (II) trifluoromethanesulfonate, and copper(II)pentafluoromethanesulfonate. The solid catalyst that can be used in production of the mixture of compound (A2) includes complex metal oxide catalysts such as hydrotalcite or a magnesium oxide to which a metal ion such as aluminum ion was added. When Lewis acid is used as the acid catalyst, a mixture of the compounds having a narrow distribution of the numbers of moles of alkylene oxide added tends to be obtained.

The reaction conditions under which a mixture of the compounds (A2) is produced are that the amount of the catalyst is preferably 0.001 to 0.1 mole (0.1 to 10 mol %) per active hydrogen in glycerin, the reaction temperature is preferably 50 to 180° C., and when the acid catalyst or solid catalyst is used, the reaction temperature is preferably 50 to 100° C. and the reaction pressure is preferably 0.1 to 0.5 MPa. When the reaction temperature is decreased, a mixture of the compounds having a narrow distribution of the numbers of moles of alkylene oxide added tends to be obtained, while when the reaction temperature is increased, the distribution of the numbers of moles of alkylene oxide added tends to be broadened.

In the general formula (A3), R's may be the same or different and each represent a hydrogen atom or a group selected from a methyl group, an ethyl group and a propyl group, and at least one of R's is a group selected from a methyl group, an ethyl group and a propyl group, each of which is an alkyl group having 1 to 3 carbon atoms. The compound of the general formula (A3) preferably has a hydrogen atom and an alkyl group having 1 to 3 carbon atoms. From the viewpoint of improving early strengthening property, the alkyl group having 1 to 3 carbon atoms is preferably a methyl group or an ethyl group, more preferably a methyl group. The alkyl group having 1 to 3 carbon atoms is located preferably at position 1 or 3 in glycerin (propane-1,2,3-triol). In the general formula (A3), $A^2O$ is an oxyalkylene group having 2 to 4 carbon atoms, that is, $A^2$ is an alkylene group having 2 to 4 carbon atoms, such as an ethylene group, a propylene group and a butylene group. $A^2$ is preferably an alkylene group having 2 to 3 carbon atoms, more preferably an alkylene group having 2 carbon atoms.

In the general formula (A3), m4 represents the average number of moles of $A^2O$ added and is a number of 0 to 2, preferably 0 to 1, more preferably substantially 0, from the viewpoint of improving early strengthening property.

The compound of the general formula (A3) includes a monoether or diether between glycerin (propane-1,2,3-triol) and a monohydric alcohol having 1 to 3 carbon atoms, and examples include 2-alkoxypropane-1,3-diol, 3-alkoxypropane-1,2-diol, 2,3-dialkoxypropane-1-ol, and compounds derived therefrom by adding an alkylene group having 2 to 4 carbon atoms to an alcohol at position 1. Among these, the compounds wherein an alkylene group having 2 to 4 carbon atoms is not added are preferable. The compound of the general formula (A3) is preferably a monoether between glycerin (propane-1,2,3-triol) and a monohydric alcohol having 1 to 3 carbon atoms, such as 2-alkoxypropane-1,3-diol and 3-alkoxypropane-1,2-diol. Specific examples include 2-methoxypropane-1,3-diol, 2-ethoxypropane-1,3-diol, 3-methoxypropane-1,2-diol, 3-ethoxypropane-1,2-diol, etc. In the case of propane-1,2,3-triol, the degree of etherification is preferably 0.2 to 0.8, more preferably 0.3 to 0.7, per mole of hydroxyl group before etherification, that is, per mole of hydroxyl group of glycerin.

The compound of the general formula (A3) can be produced by a method described in, for example, JP-A No. 2001-213827. Specifically, a glycerin-containing solution obtained through ester exchange reaction of natural fats and oils with monohydric alcohols such as methanol can be subjected to known acid decomposition, filtration, water addition, oil separation, activated carbon treatment and ion exchange treatment, then distilled for example at 9 kPa and 120° C. to remove water and then distilled for example at 0.1 kPa and 180° C. to give, as a distillate, the compound of the general formula (A3). The compound of the general formula (A3) wherein m4 is not 0 can be obtained in the same manner as for the compound of the general formula (A2) by adding alkylene oxide. The average number, and the distribution of numbers, of moles of the alkylene oxide group added can be regulated in the same manner as for the compound of the general formula (A2) by the amount of alkylene oxide charged, selection of the catalyst, and the reaction temperature.

The compound of the general formula (A3) wherein m4 is 0 can be easily produced industrially by a method including the following steps 1 to 3:

Step 1: a step of reacting fats and oils with monohydric alcohols having 1 to 5 carbon atoms, Step 2: a step of separating the product obtained in step 1 into oil and water, and Step 3: a step of distilling the aqueous phase obtained in step 2 to give the compound of the general formula (A3) as a distillate.

[Step 1]

The fats and oils used in step 1 include naturally occurring vegetable fats and oils and animal fats and oils. The vegetable fats and oils include coconut oil, palm oil, palm kernel oil, etc., and the animal fats and oils include beef tallow, lard, fish oil, etc.

Specific examples of the monohydric alcohols having 1 to 3 carbon atoms used in step 1 include monohydric alcohols having 1 to 3 carbon atoms, such as methanol, ethanol, n-propanol and 2-methylethanol.

From the viewpoint of attaining a good reaction rate, the molar ratio of monohydric alcohols to fats and oils is preferably 4.5 or more, more preferably 6 or more. From the viewpoint of effecting the reaction economically by reducing the amount of alcohols recovered, the molar ratio of alcohols to fats and oils is preferably 50 or less, more preferably 30 or less, even more preferably 15 or less. If necessary, the fats and oils may be diluted with a diluent. The diluent includes, but is not limited to, xylene, toluene, hexane, tetrahydrofuran, acetone, ether, and fatty acid alkyl esters.

The reaction in the step 1 may be carried out in the absence of a catalyst, but preferably a homogeneous or heterogeneous catalyst known in the art is used. As the homogeneous catalyst, an alkali catalyst such as sodium hydroxide can be preferably used. The heterogeneous catalyst is not particularly limited insofar as it is a catalyst having alcoholysis reaction activity, and examples thereof include sodium carbonate and sodium bicarbonate as described in JP-A No. 61-254255 and crystalline titanium silicate, crystalline titanium aluminum silicate, amorphous titanium silicate and their corresponding zirconium compounds as described in EP-B 0623581. In a preferable mode, a weakly acidic, acid catalyst described later is used.

The reaction temperature in step 1 is preferably 100 to 250° C., more preferably 150 to 240° C., from the viewpoint of attaining a sufficient catalyst activity to increase the reaction rate and of improving the formation of ethers between glycerin and monohydric alcohols.

The reaction system in step 1 may be either a batch or continuous system and may be a vessel type reactor having a stirrer or a fixed bed reactor packed with a catalyst.

When the reaction is carried out in the vessel type reactor, the amount of the catalyst used is preferably 1 wt % or more, more preferably 3 wt % or more, even more preferably 5 wt % or more, based on the fats and oils, from the viewpoint of attaining sufficient activity to complete the reaction in a short time. From the viewpoint of keeping a sufficiently suspended state under stirring, the amount of the catalyst used is preferably 20 wt % or less, more preferably 17 wt % or less, even more preferably 15 wt % or less, based on the fats and oils. The reaction is carried out usually at normal pressures, but may be carried out under increased pressure or under reduced pressure. Under a reduced pressure, a gas/liquid/solid reaction can be carried out by gasifying an alcohol at a temperature not higher than the boiling point of the used alcohol at the atmospheric pressure. Under an increased pressure, on the other hand, a liquid/liquid/solid reaction can be carried out by preventing the alcohol from evaporating at a temperature not lower than the boiling point of the alcohol at the atmospheric pressures.

When the reaction is continuously carried out in a fixed bed reactor, the liquid hourly space velocity (LHSV) based on the fats and oils is preferably not lower than 0.02/hr, more preferably not lower than 0.1/hr, from the viewpoint of increasing productivity per unit volume of the reactor to effect the reaction economically. From the viewpoint of attaining a sufficient reaction rate, the LHSV is preferably not higher than 2.0/hr, more preferably not higher than 1.0/hr. The reaction pressure is preferably 0.1 to 10 MPa, more preferably 0.5 to 8 MPa. When the reaction is carried out in a liquid/liquid/solid system, the reaction pressure is established according to the vapor pressure and reaction temperature of the monohydric alcohols.

When fixed bed reactors are used, the method of feeding monohydric alcohols in the present invention is conducted preferably a method carried out by pseudo-countercurrent operation which is co-current operation in each of the fixed bed reactors but is judged to be countercurrent operation in view of the facilities as a whole.

[Step 2]

Step 2 is a step of separating the product obtained in step 1 into oil and aqueous phases. The separation method is not particularly limited and the product can be separated by methods known in the art, such as separation by leaving the product (stationary separation) or condensation separation. The separation temperature is preferably 80° C. or less, more preferably 70° C. or less, even more preferably 60° C. or less. The separated oil phase contains fatty acid alkyl esters, the starting materials and glycerides as reaction intermediates, as well as a trace amount of water, monohydric alcohols, glycerin, etc. On the other hand, the aqueous phase contains the compound of the general formula (A3), glycerin, water and monohydric alcohols.

[Step 3]

Step 3 is a step of distilling the aqueous phase obtained in step 2 to give the compound of the general formula (A3) as a distillate. The aqueous phase is distilled initially under the conditions of a temperature of 70 to 140° C. and a pressure of 6.5 to 27 kPa to remove components (water, lower alcohols, etc.) not corresponding to the compound of the general formula (A3) and then under the conditions of a temperature of 130 to 180° C. and a pressure of 0.1 to 0.8 kPa, thereby allowing the compound of the general formula (A3) to be distilled away and recovered. Usually, the distillate is obtained as a mixture containing the compounds of the general formula (A3). As long as the effect of the present invention can be obtained, the distillate can be used directly as a mixture containing one or more compounds of the general formula (A3). The distillate may contain a plurality of different compounds of the general formula (A3). The compound of the general formula (A3) wherein m4 is not 0 can be obtained in the same manner as for the compound of the general formula (A2) by adding alkylene oxide. The average number, and the distribution of numbers, of moles of the oxyalkylene group added can be regulated in the same manner as for the compound of the general formula (A2) by the amount of alkylene oxide charged, selection of the catalyst, and the reaction temperature.

In the early strengthening agent for a hydraulic composition in the present invention, the content of the component (A), in terms of the concentration of the effective component, is preferably 5 to 95% by weight, more preferably 10 to 50% by weight, even more preferably 20 to 30% by weight. The content is preferably 5% by weight or more from the viewpoint of improving early strengthening property or is preferably 95% by weight or less from the viewpoint of uniform stabilization of products.

In the early strengthening agent for a hydraulic composition in the present invention, the component (A) is used preferably in an amount of 0.01 to 1 part by weight based on 100 parts by weight of the hydraulic powder. That is, in the early strengthening agent for a hydraulic composition in the present invention, the component (A) (effective component) is used preferably in an amount of 0.01 to 1% by weight, more preferably 0.05 to 0.5% by weight, even more preferably 0.1 to 0.2% by weight, based on the hydraulic powder.

The component (A) in the present invention is used usually in combination with components known as concrete admixtures such as phosphate polymers, polycarboxylic acid or sulfonic acid copolymers, naphthalene-based polymers, melamine-based polymers, phenol-based polymers and lignin-based polymers. Preferably components to be used in combination are components (B) and (C) below, more preferably component (B) or a combination of components (B) and (C).

Accordingly, the present invention can provide a composition (an additive composition for a hydraulic composition) containing the early strengthening agent for a hydraulic composition in the present invention (component (A)) and a dispersant for hydraulic powder. The dispersant is preferably at least one copolymer selected from a phosphate polymer as the component (B) and a copolymer as the component (C).

<Component (B)>

The additive composition for a hydraulic composition in the present invention, from the viewpoint of the surface texture of a cured product of the hydraulic composition, contains a phosphate polymer (B) (hereinafter, referred to as component (B)) obtained by copolymerizing, at pH 7 or less, a monomer 1 represented by the following general formula (B1):

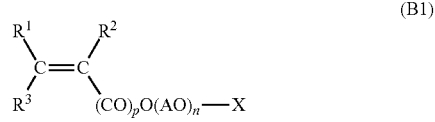

wherein $R^1$ and $R^2$ each independently represent a hydrogen atom or a methyl group, $R^3$ represents a hydrogen atom or —COO(AO)$_n$X, AO represents an oxyalkylene group having 2 to 4 carbon atoms or an oxystyrene group, p is a number of 0 or 1, n is the average number of moles of AO added and is a number of 3 to 200, and X represents a hydrogen atom or an alkyl group having 1 to 18 carbon atoms, a monomer 2 represented by the following general formula (B2)

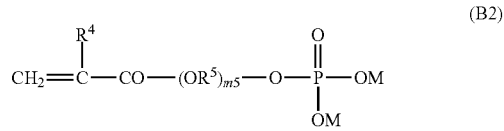

wherein $R^4$ represent a hydrogen atom or a methyl group, $R^5$ represents an alkylene group having 2 to 12 carbon atoms, m5 represents a number of 1 to 30, and M represents a hydrogen atom, an alkali metal or an alkaline earth metal (½ atom), and a monomer 3 represented by the following general formula (B3):

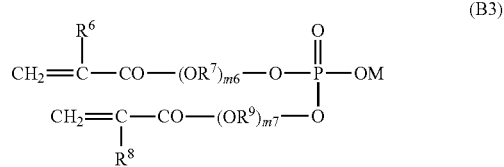

wherein $R^6$ and $R^8$ each independently represent a hydrogen atom or a methyl group, $R^7$ and $R^9$ each independently represent an alkylene group having 2 to 12 carbon atoms, m6 and m7 each independently represent a number of 1 to 30, and M represents a hydrogen atom, an alkali metal or an alkaline earth metal (½ atom).

The component (B) is a phosphate polymer obtained by copolymerizing a monomer mixture containing the monomers 1, 2 and 3 at pH 7 or less.

(Monomer 1)

In the monomer 1, $R^3$ in the general formula (B1) is preferably a hydrogen atom, AO is preferably an oxyalkylene group having 2 to 4 carbon atoms and more preferably contains an ethyleneoxy group (hereinafter, referred to as EO group) wherein the amount of the EO group is preferably 70 mol % or more, more preferably 80 mol % or more and even more preferably 90 mol % or more, and it is even more preferable that every AO be an EO group. X is a hydrogen atom or an alkyl group having preferably 1 to 18 carbon atoms, more preferably 1 to 12 carbon atoms, even more preferably 1 to 4 carbon atoms and even more preferably 1 or 2 carbon atoms, and is even more preferably a methyl group.

Specific examples include ω-methoxypolyoxyalkylene methacrylate and ω-methoxypolyoxyalkylene acrylate, among which ω-methoxypolyoxyalkylene methacrylate, is more preferable. In the general formula (B1), n is 3 to 200, more preferably 4 to 120, from the viewpoint of the ability of the polymer to confer dispersibility and low viscosity on hydraulic compositions. In the repeating units whose average number is n, different AO units may be added in a random form and/or a block form. AO units may contain propyleneoxy groups, etc. in addition to EO groups.

(Monomer 2)

The monomer 2 includes mono(2-hydroxyethyl)methacrylic acid phosphate ester, mono(2-hydroxyethyl)acrylic acid phosphate ester, and polyalkylene glycol mono(meth)acrylate acid phosphates.

Among these compounds, mono(2-hydroxyethyl) methacrylic acid phosphate ester is preferable from the viewpoint of production easiness and the stability of product quality.

(Monomer 3)

The monomer 3 includes di-[(2-hydroxyethyl)methacrylic acid]phosphate ester and di-[(2-hydroxyethyl)acrylic acid] phosphate ester. Among these compounds, di-[(2-hydroxyethyl)methacrylic acid]phosphate ester is preferable from the viewpoint of production easiness and the stability of product quality.

Any of monomers 2 and 3 may be an alkali metal salt, alkaline earth metal salt, ammonium salt or alkylammonium salt of such compound.

m5 in the monomer 2 and m6 and m7 in the monomer 3 each represent preferably 1 to 20, more preferably 1 to 10, even more preferably 1 to 5, from the viewpoint of dispersibility.

As the monomers 2 and 3, a monomer mixture containing them can be used. That is, commercially available products containing the monoester and diester may be used. These products are available under the name of Phosmer M, Phosmer PE and Phosmer P (Unichemical), JAMP514, JAMP514P and JMP100 (all of these products are manufactured by Johoku Chemical Co., Ltd.), Light Ester P-1M, Light Acrylate P-1A (all of these products are manufactured by Kyoeisha Chemical Co., Ltd.), MR200 (Daihachi Chemical Industry Co., Ltd.), Kayamer (Nippon Kayaku Co., Ltd.) and ethyleneglycol methacrylate phosphate (Aldrich reagent).

A monomer mixture containing the monomers 2 and 3 can be produced as a reaction product, for example by reacting an organic hydroxy compound represented by the general formula (B4) below, phosphoric anhydride ($P_2O_5$), and water in a predetermined charging ratio.

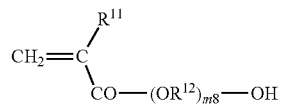

(B4)

wherein $R^{11}$ represents a hydrogen atom or a methyl group, $R^{12}$ represents an alkylene group having 2 to 12 carbon atoms, and m8 represents a number of 1 to 30.

In the general formula (B4), m8 is preferably 1 to 20, more preferably 1 to 10, even more preferably 1 to 5.

Each of the monomers 2 and 3 is a phosphate of a monomer having an unsaturated bond and a hydroxyl group and it has been confirmed that the above commercially available products and reaction products contain compounds other than a monoester (monomer 2) and a diester (monomer 3). Though polymerizable compounds and non-polymerizable compounds are considered to be mixed in these other compounds, such a mixture (monomer mixture) may be used as it is in the present invention.

The content of the monomers 2 and 3 in the monomer mixture can be calculated based on the results of $^{31}$P-NMR measurement.

<$^{31}$P-NMR Measurement Conditions>

Inverse-gated-decoupling method
Range of measurement: 6459.9 Hz
Pulse delay time: 30 sec
Observed data points: 10336
Pulse width (5.833 μsec): 35° pulse
Solvent $CD_3OH$ (heavy methanol) (concentration during measurement: 30% by weight)
Number of integrated counts: 128

Signals of the obtained chart are assigned to the following compounds, and from the area ratios of the signals, relative amount ratios can be determined.

For example, when the organic hydroxy compound is a phosphate of "2-hydroxyethyl methacrylate", it can be assigned to the following elements.

1.8 ppm to 2.6 ppm: Phosphoric acid
0.5 ppm to 1.1 ppm: Monomer 2 (monoester)
−0.5 ppm to 0.1 ppm: Monomer 3 (diester)
−1.0 ppm to −0.6 ppm: Triester
−11.1 ppm to −10.9 ppm, −12.4 ppm to −12.1 ppm: Monopyrophosphosphate
−12.0 ppm to −11.8 ppm: Dipyrophosphate
−11.2 ppm to −11.1 ppm: Pyrophosphoric acid
Other peaks: Undefined elements.

In the present invention, the content of phosphoric acid in the monomer mixture is measured quantitatively to determine the content of the monomers 2 and 3. Specifically, it is calculated as follows.

The absolute amount (wt %) of the content of phosphoric acid in a sample is determined by gas chromatography. From the results of P-NMR, the relative molar ratios of phosphoric acid, monoester and diester in the sample are determined to calculate the absolute amount of the monoester and diester based on the absolute amount of the phosphoric acid.

(Content of Phosphoric Acid)

The conditions for gas chromatography are as follows.
Sample: Methylated with diazomethane.
Example) 1 to 1.5 cc of a diethyl ether solution of diazomethane is added to 0.1 g sample thereby methylating the sample.
Column: Ultra Alloy, 15 m×0.25 mm (inner diameter)× 0.15 μmdf
Carrier gas, He; sprit ratio, 50:1
Column temperature: 40° C. (5 min) (retention)→10° C./min (temperature is raised)→after the temperature reaches 300° C., the sample is retained for 15 minutes.
Inlet temperature: 300° C.
Detector temperature: 300° C.

The peak derived from the phosphoric acid is detected about 9 minutes under the above conditions, whereby the content of the phosphoric acid in an undefined sample can be calculated according to a calibration curve method.

As described above, the phosphate monomers can be industrially obtained as mixtures containing the monoester (monomer 2) and diester (monomer 3). Among these, the diester is easily crosslinked thereby being formed into a high-molecular weight compound (gelling), so that in fields utilizing this property, for example in applications to thickeners, adhesives, coatings, etc., such mixtures can be preferably used without imposing too much limitation on production.

For use in admixtures (dispersants, water reducing agents, etc.) for hydraulic compositions, on the other hand, its phosphoric acid group-containing polymers is preferable because of their excellent ability to adsorb hydraulic substances, but these polymers when formed into high-molecular-weight compounds deteriorate their dispersibility and viscosity reducing effect, thus making them undesirable from the viewpoint of handleability. However, separation of such phosphate mixture into the monoester and diester prior to use as starting material is industrially disadvantageous from the viewpoint of application to the hydraulic composition and economical nature.

From the viewpoint of fluidity and viscosity-reducing effect, a phosphate mixture containing a larger amount of the monoester is more preferably used, but a phosphate mixture even containing a large amount of the diester can regulate the fluidity and viscosity-reducing effect by controlling the copolymerization molar ratio to the monomer 1.

As the monomers 3 and 4, a phosphate (Y) obtained by reacting an organic hydroxy compound represented by the general formula (B4) with a phosphatizing agent may also be used. That is, a phosphate copolymer obtained by copolymerizing (X) below with (Y) below at pH 7 or less can be used as a copolymer serving as the component (B) in the present invention.

(X) Monomer 1 represented by the general formula (B1).

(Y) Phosphate obtained by reacting an organic hydroxy compound represented by the general formula (B4) with a phosphatizing agent.

The phosphate (Y) is obtained by phosphatizing an organic hydroxy compound represented by the general formula (B4) with a phosphatizing agent.

The phosphatizing agent includes orthophosphoric acid, phosphorus pentoxide (phosphoric anhydride), polyphosphoric acid, phosphorous oxychloride and the like, among which orthophosphoric acid and phosphorus pentoxide are preferable. These can be used alone or in combination with two or more thereof. A phosphatizing agent (Z) described later is also preferable. When the phosphatizing agent is reacted with the organic hydroxy compound in the present invention, the amount of the phosphatizing agent can be suitably determined depending on the intended phosphate composition.

The phosphate (Y) is preferably one obtained by reacting the organic hydroxy compound with the phosphatizing agent in such a condition that the ratio defined by the following formula (I) is 2.0 to 4.0, preferably 2.5 to 3.5 and more preferably 2.8 to 3.2.

([The mole number of water in the phosphatizing agent including $n(H_2O)$ in the case of representing the phosphatizing agent as $P_2O_5(H_2O)$]+[the mole number of the organic hydroxy compounds])/(the mole number of the phosphatizing agents when the phosphatizing agent is converted into $P_2O_5$)     (I)

In the present invention, the phosphatizing agent in the formula (I) shall be treated as $P_2O_5.n(H_2O)$ for the sake of convenience.

As the phosphatizing agent, a phosphatizing agent (hereinafter referred to as a phosphatizing agent (Z)) containing phosphorous pentoxide (Z-1) and at least one (z-2) selected from water, phosphoric acid and polyphosphoric acid is preferable. In this case, in the formula (I), the phosphatizing agent (Z) containing phosphorous pentoxide (Z-1) and at least one (z-2) selected from water, phosphoric acid and polyphosphoric acid is treated as $P_2O_5n(H_2O)$ for the sake of convenience.

The mole number of the phosphatizing agents defined in the formula (I) shows the amount (mols) of a $P_2O_5$ unit derived from the phosphatizing agent, especially the phosphatizing agent (Z), to be introduced as starting material into the reaction system. Also, the mole number of water shows the amount (mol) of water ($H_2O$) derived from the phosphatizing agent (Z) to be introduced into the reaction system. Specifically, the water contains all waters existing in the reaction system including the waters contained when the polyphosphoric acid is represented by ($P_2O_5.xH_2O$) and the orthophosphoric acid is represented by ($\frac{1}{2}(P_2O_5.3H_2O)$)).

The temperature at the time of addition of the phosphatizing agent to the organic hydroxy compound is preferably 20 to 100° C. and more preferably 40 to 90° C. Also, the time required to add the phosphatizing agent to the reaction system (time from when the addition of the phosphatizing agent is initiated till when the addition is finished) is preferably 0.1 hour to 20 hours and more preferably 0.5 hour to 10 hours.

The temperature in the reaction system after the phosphatizing agent is added is preferably 20 to 100° C. and more preferably 40 to 90° C. Copolymerization can be carried out according to the method for producing a phosphate polymer as described later.

After the phosphatizing reaction is finished, the produced condensates (organic compounds having a pyrophosphoric acid bond and phosphoric acid) of phosphoric acid may be reduced by hydrolysis or may be used as a monomer for producing the phosphate polymer of the present invention even if these condensates are not hydrolyzed.

The weight average molecular weight (Mw) of the phosphate polymer as the component (B) in the present invention is preferably 10,000 to 150,000. The Mw/Mn is preferably 1.0 to 2.6. Mn is number average molecular weight. The component (B) has a Mw of preferably 10,000 or more, more preferably 12,000 or more, even more preferably 13,000 or more, even more preferably 14,000 or more and further even more preferably 15,000 or more from the viewpoint of dispersing effect and viscosity reducing effect, and preferably 150,000 or less, more preferably 130,000 or less, even more preferably 120,000 or less, even more preferably 110,000 or less and further even more preferably 100,000 or less from the viewpoint of suppressing an increase in molecular weight due to crosslinking and limiting gelation and of improving the performances including a dispersing effect and viscosity reducing effect. From both the viewpoints, the Mw of the component (B) is preferably 12,000 to 130,000, more preferably 13,000 to 120,000, even more preferably 14,000 to 110,000 and even more preferably 15,000 to 100,000. With the Mn in this range, the Mw/Mn is preferably 1.0 to 2.6. Mw/Mn is indicative of the dispersivity of molecular weight distribution, and as Mw/Mn is nearer to 1, the molecular weight distribution approaches monodispersity, and as Mw/Mn is made apart from 1 (increased), the molecular weight distribution is broadened.

The phosphate polymer according to the present invention having the Mw/Mn value described above is characterized mainly by being a polymer, though having a branched structure based on the diester structure, having a very narrow molecular weight distribution. The phosphate polymer of the present invention can be preferably produced by a production method described later.

The aforementioned Mw/Mn of the phosphate polymer according to the present invention as mentioned above is preferably 1.0 or more from the viewpoint of securing practical production easiness, dispersibility, viscosity-reducing effect and accommodation to material and temperature and preferably 2.6 or less, more preferably 2.4 or less, even more preferably 2.2 or less, even more preferably 2.0 or less and further even more preferably 1.8 or less from the viewpoint of achieving the compatibility between dispersibility and viscosity-reducing effect. The Mw/Mn is preferably 1.0 to 2.4, more preferably 1.0 to 2.2, even more preferably 1.0 to 2.0 and even more preferably 1.0 to 1.8 taking all of the above two conditions into consideration.

Mw and Mn of the phosphate polymer in the present invention are values measured by gel permeation chromatography (GPC) under the following conditions. It is to be noted that Mw/Mn of the phosphate polymer in the present invention is calculated based on the peaks of the polymer.

(GPC Conditions)

Columns: G4000PWXL+G2500PWXL (Tosoh Corporation)

Eluent: 0.2 M phosphoric acid buffer/$CH_3CN$=9/1

Flow rate: 1.0 mL/min

Column temperature: 40° C.

Detection: RI

Sample size: 0.2 mg/mL

Standards: polyethylene glycols

It is considered that the phosphate polymer meeting the above requirement of Mw/Mn constitutes a suitable branched structure by inhibiting the crosslinking of the diester as monomer 3, thereby forming a structure having absorbing groups present densely in its molecule. It is also considered that, by controlling the degree of dispersion Mw/Mn in a predetermined range, the system gets closer to a system in which molecules having the same size are rendered monodisperse, thus possibly increasing an amount of adsorbed one onto an object for adsorption, such as cement particles. It is estimated that by satisfying both conditions, the phosphate polymer enables dense packing the intended material such as cement particles therewith, thereby effectively attaining both dispersibility and viscosity-reducing effect.

For dispersibility (reduction in required amount) and viscosity-reducing effect, it is more preferable that the area of the phosphate polymers with molecular weights of 100,000 or more in the pattern of a chart showing the distribution of molecular weight obtained by GPC under the conditions described above is 5% or less of the whole area.

The phosphate polymer in the present invention has eliminated monomer-derived double bonds in $^1$H-NMR under the following conditions and is thus estimated to have structural units derived from the monomers 1, 2 and 3 respectively.

($^1$H-NMR Conditions)

The polymer dissolved in water is dried under reduced pressure. The dried product is then dissolved in a concentration of 3 to 4% by weight in heavy methanol and measured by $^1$H-NMR. The residual ratio of double bonds is determined from their integral value in the range of 5.5 to 6.2 ppm. The measurement of $^1$H-NMR is performed using "Mercury 400 NMR" manufactured by Varian Company under the following conditions: the number of data points: 42052, measurement range: 6410.3 Hz, pulse width: 4.5 µs, pulse waiting time: 10 s, and measurement temperature: 25.0° C.

That is, the phosphate polymer having the above-mentioned Mw/Mn value contains, as its constituent units, a constituent unit derived from the monomer 1, a constituent unit derived from the monomer 2 and a constituent unit derived from the monomer 3, respectively. These constituent units are the monomer-derived constituent units which were incorporated into the polymer by addition polymerization of the monomers 1, 2 and 3 after cleavage of their ethylenically unsaturated bonds. The ratio of these constituent units in the polymer depends on the charging ratio of the monomers, so it is considered that when the monomers used in copolymerization are the monomers 1 to 3 only, the molar ratio of the respective constituent units are considered to almost agree with the charging molar ratio of the monomers.

<<Method for Producing the Phosphate Polymer>>

The phosphate polymer according to the present invention can be produced by a method for producing the phosphate polymer by copolymerizing the monomers 1, 2 and 3 at pH 7 or less. A monomer solution containing the monomers 2 and 3 is preferably used.

As described above, phosphate monomers obtained industrially as a mixture have been hardly subjected to use in hydraulic composition, but the monomer mixture containing the monomer 2 and/or the monomer 3 can be used in the reaction in a specific pH range to copolymerize the monomer 1 with the monomers 2 and 3 as phosphate monomers, thereby preventing crosslinking (increase in high-molecular weight; gelling) even if a diester-containing material is used, and further the excellent performance of the phosphate polymer as a dispersant for a hydraulic composition can be maintained, so that this production method of the present invention serves as a method extremely advantageous in the field of hydraulic compositions.

The phosphate polymer according to the present invention is a polymerized product obtained by copolymerizing the monomer 1 having an oxyalkylene group represented by the general formula (B1), the monomer 2 having a phosphoric acid group represented by the general formula (B2) and the monomer 3 represented by the general formula (B3).

Preferable examples of the monomers 1 to 3 are as described above and may also be the aforementioned commercially available products and reaction products.

In copolymerization of the monomers, the molar ratio of the monomers 1 to the monomers 2 and 3, that is, monomer 1/(monomer 2+monomer 3), is preferably 5/95 to 95/5, more preferably 10/90 to 90/10. The molar ratio of the monomers 1, 2 and 3, that is, monomer 1/monomer 2/monomer 3, is preferably 5 to 95/3 to 90/1 to 80, more preferably 5 to 96/3 to 80/1 to 60 (provided that the total of the monomer 1, 2 and 3 is 100). With regard to the monomers 2 and 3, each molar ratio and mol % shall be calculated based on the acid-type compounds (this applies hereinafter).

In the present invention, the ratio of the monomer 3 in all monomers used in the reaction can be 1 to 60 mol %, particularly 1 to 30 mol %.

Also, the molar ratio of the monomer 2 to the monomer 3, that is, monomer 2/monomer 3, can be 99/1 to 4/96, particularly 99/1 to 5/95.

The monomer material containing the monomer 3 in these ranges is predicted to be generally significantly gelled and is thus usually not used as a starting material to produce the polymer as a dispersant for hydraulic compositions. In the present invention, however, the monomer solution containing the monomer 2 and/or the monomer 3 can be used in the reaction at pH 7 or less, thereby suppressing gelation to produce the phosphate polymer preferable as a dispersant for hydraulic compositions at industrially practical level.

More preferable production conditions will be explained from the viewpoint of suppressing gelation and controlling preferable molecular weight and also from the viewpoint of performance design of the hydraulic composition dispersant. From these viewpoints, a chain transfer agent is used in an amount of preferably 4 mol % or more, more preferably 6 mol % or more and even more preferably 8 mol % or more based on the total mole number of the monomers 1 to 3 in the copolymerization. The upper limit of the amount of the chain transfer agent used is preferably 100 mol % or less, more preferably 60 mol % or less, even more preferably 30 mol % or less and even more preferably 15 mol % or less based on the total mole number of the monomers 1 to 3.

To state in more detail:

(1) when n of the monomer 1 is 3 to 30; and (1-1) when the molar ratio of the monomers 2 and 3 to the sum of the monomers 1 to 3 is 50 mol % or more, the chain transfer agent is used in an amount of preferably 6 to 100 mol %, more preferably 8 to 60 mol %, based on the sum of the monomers 1 to 3; and (1-2) when the molar ratio of the monomers 2 and 3 to the sum of the monomers 1 to 3 is less than 50 mol %, the chain transfer agent is used in an amount of preferably 4 to 60 mol %, more preferably 5 to 30 mol %, based on the sum of the monomers 1 to 3; and (2) when n of the monomer 1 exceeds 30, the chain transfer agent is used in an amount of preferably 6 to 50 mol %, more preferably 8 to 40 mol %, based on the sum of the monomers 1 to 3.

In the production method for obtaining the component (B) in the present invention, the degree of reaction between the monomers 2 and 3 is preferably 60% or more, more preferably 70% or more, even more preferably 80% or more, even more preferably 90% or more and further even more preferably 95% or more, and from this viewpoint, the amount of the chain transfer agent can be selected. The degree of reaction between the monomers 2 and 3 is calculated according to the following equation:

$$\text{Degree of reaction (\%)} = (1 - Q/P) \times 100$$

Q: the ratio of the ethylenically unsaturated bonds of the monomers 2 and 3 to X derived from the monomer 1 in the reaction system after the reaction is finished.

P: the ratio of the ethylenically unsaturated bonds of the monomers 2 and 3 to X derived from the monomer 1 in the reaction system when the reaction is initiated.

The ratio (mol %) of the monomers 2 and 3 in the phosphorus-containing compound in the reaction system when the reaction is initiated or finished can be calculated on the basis of measurement results by $^1$H-NMR described above.

In the production of the phosphate polymer in the present invention, other polymerizable monomer (s) may be used besides the aforementioned monomers 1 to 3. Examples of the other polymerizable monomer may include allylsulfonic acid, methallylsulfonic acid or alkaline metal salts, alkali earth metal salts, ammonium salts or amine salts of any of these acids. Also, examples of the other polymerizable monomer may include carboxylic acid monomers such as acrylic acid, methacrylic acid, crotonic acid, maleic acid, fumaric acid, itaconic acid and citraconic acid. The other polymerizable monomer may be a compound of at least one of the acids, for example, selected from alkali metal salts, alkaline earth metal salts, ammonium salts, amine salts, methyl esters, ethyl ester or anhydrides, such as maleic anhydride. Examples of the other polymerizable monomer also include (meth)acrylamide, N-methyl (meth)acrylamide, N,N-dimethyl (meth) acrylamide, 2-(meth)acrylamide-2-methasulfonic acid, 2-(meth)acrylamide-2-ethanesulfonic acid, 2-(meth)acrylamide-2-propanesulfonic acid, styrene and styrenesulfonic acid. The total proportion of the monomers 1 to 3 in all monomers is preferably 30 to 100 mol %, more preferably 50 to 100 mol %, even more preferably 75 to 100 mol %, and from the viewpoint of achieving the described performance, as a dispersant, of the phosphate polymer according to the present invention, the total proportion of the monomers 1 to 3 in all monomers is even more preferably 95 to 100 mol %, even more preferably 97 to 100 mol % and further even more preferably 100 mol %.

In the production method for obtaining the component (B) in the present invention, the reaction temperature of the monomers 1 to 3 is preferably 40 to 100° C. and more preferably 60 to 90° C. and the reaction pressure in terms of gauge pressure is preferably 101.3 to 111.5 kPa (1 to 1.1 atm) and more preferably 101.3 to 106.4 kPa (1 to 1.05 atm).

A monomer solution containing the monomer 2 and/or monomer 3 prepared in a suitable solvent is copolymerized with other monomers, preferably at pH 7 or less in the presence of a predetermined amount of a chain transfer agent. Also, other copolymerizable monomers, a polymerization initiator and the like may be used.

The component (B) in the present invention is obtained by reacting the monomers 1, 2 and 3 at pH 7 or less. The reaction solution collected during the reaction (from initiation to termination of the reaction) suffices where the pH is 7 or less at 20° C. Usually, the reaction may be initiated under conditions (monomer ratio, solvent and other components, etc.) where the pH becomes evidently 7 or less during the reaction.

When the reaction system is a non-aqueous system, the pH can be measured after water in an amount to enable pH measurement is added to the reaction system.

(Chain Transfer Agent)

The chain transfer agent is a material which in radical polymerization, has a function of initiating a chain transfer reaction (a reaction in which polymer radicals under growing react with other molecules to cause radical active points to be transferred) and is added with the intention of transferring a chain unit.

Examples of the chain transfer agent include thiol-based chain transfer agents and halogenated hydrocarbon chain transfer agents, among which the thiol-based chain transfer agents are preferable.

The thiol-based chain transfer agents are preferably those having a —SH group, especially those represented by the formula HS—R-Eg wherein R represents a group derived from a hydrocarbon having 1 to 4 carbon atoms, E represents —OH, —COOM, —COOR" or —SO$_3$M group (M represents a hydrogen atom, a monovalent metal, a divalent metal, an ammonium group or an organic amine group and R" represents an alkyl group having 1 to 10 carbon atoms and g denotes an integer from 1 to 2.) Examples of such thiol-based chain transfer agents include mercaptoethanol, thioglycerol, thioglycolic acid, 2-mercaptopropionic acid, 3-mercaptopropionic acid, thiomalic acid, octyl thioglycolate and octyl 3-mercaptopropionate. Mercaptopropionic acid and mercaptoethanol are preferable and mercaptopropionic acid is more preferable from the viewpoint of a chain transfer effect in the copolymerization reaction of the system containing the monomers 1 to 3. One or two or more of these compounds may be used.

Examples of the halogenated hydrocarbon chain transfer agent include carbon tetrachloride and carbon tetrabromide.

Examples of other chain transfer agents may include α-methylstyrene dimer, terpinolene, α-terpinene, α-terpinene, dipentene and 2-aminopropan-1-ol. These chain transfer agents may be used either alone or in combinations of two or more thereof.

(Polymerization Initiator)

In the production method for obtaining the component (B) in the present invention, a polymerization initiator is preferably used, and particularly the polymerization initiator is used preferably in an amount of 5 mol % or more, more preferably 7 to 50 mol % and even more preferably 10 to 30 mol % based on the total mole number of the monomers 1 to 3.

As an aqueous type polymerization initiator, ammonium persulfate, alkali metal persulfate, hydrogen peroxide, or water-soluble azo compounds such as 2,2'-azobis(2-amidinopropane) dihydrochloride and 2,2'-azobis(2-methylpropionamide) dihydrate may be used. Also, a promoter such as sodium hydrogen sulfite or an amine compound may be used in combination with the polymerization initiator.

(Solvent)

The production method for obtaining the component (B) in the present invention may be carried out by solution polymerization. Examples of the solvent used in this process include water or water-containing solvents, that is, those containing water and methyl alcohol, ethyl alcohol, isopropyl alcohol acetone, methyl ethyl ketone or the like. Water is preferable in consideration of handleability and reaction facilities. Particularly when an aqueous solvent is used, the pH of the monomer solution containing the monomer 2 and/or the monomer 3 is preferably 7 or less, more preferably 0.1 to 6 and even more preferably 0.2 to 4 during the copolymerization reaction, from the viewpoint of the uniformity (handleability) of the monomer mixture solution, the reaction rate of the monomers, and the prevention of crosslinking by hydrolysis of a pyro-form of the phosphate-based compound.

One example of the production method for obtaining the component (B) in the present invention will be explained. A reactor is charged with a predetermined amount of water, the atmosphere in the reactor is substituted with an inert gas such as nitrogen, and the temperature of the reactor is raised. A mixture obtained by mixing and dissolving the monomers 1, 2 and 3 and the chain transfer agent in water, and a mixture obtained by dissolving the polymerization initiator in water, are prepared in advance and then added dropwise to the reactor over 0.5 to 5 hours. At this time, each monomer, the chain transfer agent and the polymerization initiator may be added dropwise separately. Alternatively, a reactor may be charged with a monomer mixture solution to which only the polymerization initiator is to be added dropwise. That is, the chain transfer agent, the polymerization initiator and other additives may be added either as an additive solution separately from the monomer solution or as a mixture containing them in the monomer solution. However, they are preferably supplied to the reaction system as the additive solution separately from the monomer solution, from the viewpoint of stability in polymerization. In any case, the pH of the solution containing the monomer 2 and/or the monomer 3 is preferably 7 or less. While the pH is kept preferably at 7 or less with an acid or the like, the copolymerization reaction is carried out followed by aging preferably for a predetermined time. In this case, the polymerization initiator may be added dropwise either in whole amount simultaneously with the monomers or in lots. It is however preferable to add the polymerization initiator in lots with the view of reducing unreacted monomers. For example, it is preferable that the polymerization initiator in an amount ½ to ⅔ relative to the total amount of the finally added initiator is added simultaneously with the monomers, and after the dropwise addition of the monomers, and subsequent aging for 1 to 2 hours, are finished, the remainder initiator is added. After the aging is finished, the aged solution is neutralized by an alkali (for example, sodium hydroxide) according to the need, to yield the phosphate polymer of the present invention.

The total amount of the monomers 1, 2 and 3 and other copolymerizable monomers is preferably 5 to 80% by weight, more preferably 10 to 65% by weight and even more preferably 20 to 50% by weight.

In the present invention, two or more kinds (or three or more kinds) of the components (B) can be used. A plurality of the components (B) can be selected depending on criteria such as formulation of the intended hydraulic composition, constituent materials, performance, etc. Is preferable, for example, a combination of a copolymer (B1a) wherein the proportions of the monomer 1 represented by the general formula (B1) in the amount of all monomers are 1 to 55 mol % with (B1b) where it is more than 55 mol %. If a third copolymer is further selected and used in addition to (B1a) and (B1b), that is, totally 3 kinds of copolymers are used, then 2 kinds of copolymers (B1b) are preferably used wherein one kind of (B1b) (second copolymer) is preferably a copolymer wherein the proportion of the monomer 1 is 55 to 65 mol % based on the amount of all monomers and the other kind of (Bib) (third copolymer) is preferably a copolymer wherein the proportion of the monomer 1 is more than 65 mol % based on the amount of all monomers.

<Component (C)>

The additive composition for a hydraulic composition in the present invention contains the components (A) and (B) described above and can further contain a specific copolymer as copolymer (C). As the component (C), an admixture containing the component (C), for example, an admixture available as a dispersant for a hydraulic composition can be used.

The component (C) is a copolymer containing, as constituent units, a monomer (a) represented by the following general formula (C1-1):

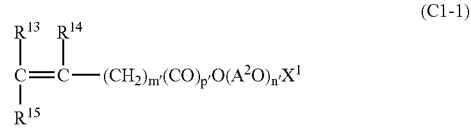

wherein:

$R^{13}$, $R^{14}$: a hydrogen atom or —$CH_3$, $R^{15}$: a hydrogen atom or —COO(AO)$_n$X, $A^2$: an alkylene group having 2 to 4, $X^1$: a hydrogen atom or an alkyl group having 1 to 18 carbon atoms, m': a number of 0 to 2, n': a number of 2 to 300, and p': a number of 0 or 1; and a monomer (b) selected from:

a monomer represented by the following general formula (C1-2):

wherein:

$R^{16}$, $R^{17}$, $R^{18}$ may be the same or different and each represent a hydrogen atom, —$CH_3$ or $(CH_2)_r COOM^2$, and $(CH_2)_r COOM^2$ may, together with $COOM^1$ or another $(CH_2)_r COOM^2$, form an anhydride wherein $M^1$ and $M^2$ in the above groups do not exist, $M^1$, $M^2$: a hydrogen atom, an alkali metal, an alkaline earth metal (½ atom), an ammonium group, an alkyl ammonium group or a substituted alkyl ammonium group, and r: a number of 0 to 2; and a monomer represented by the following general formula (C1-3):

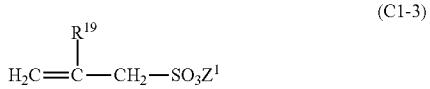

(C1-3)

wherein:

R$^{19}$: a hydrogen atom or —CH$_3$, and

Z$^1$: a hydrogen atom, an alkali metal, an alkaline earth metal (½ atom), an ammonium group, an alkyl ammonium group or a substituted alkyl ammonium group.

In the formula (C1-1), alkylene glycols (A$^2$O), the number of which is n', may be the same or different, and when alkylene glycols are different, they may be added in a random form and/or a block form.

In consideration of the polymerization efficiency of polyalkylene glycol, the number (n') of moles of A$^2$O added should be 300 or less and is preferably 150 or less, more preferably 130 or less. From the viewpoint of cement dispersibility, the number of moles (n') is 2 to 300.

Preferable examples of the monomer (a) include (half) esters) esters of (meth)acrylic acid or maleic acid, or ethers of (meth)allyl alcohol, with polyalkylene glycol terminated with a lower alkyl group at one terminal, such as methoxy polyethylene glycol, methoxy polypropylene glycol or ethoxy polyethylene polypropylene glycol and (meth)acrylic acid, maleic acid or (meth)allyl alcohol/EO or PO adducts. In the general formula (C1-1), R$^{15}$ is preferably a hydrogen atom, p' is preferably 1 and m' is preferably 0. Alkylene oxide (A$^2$O group in the formula (C1-1)) is preferably an oxyethylene group. The monomer (a) is preferably an ester of alkoxy, particularly methoxy polyethylene glycol, with (meth)acrylic acid.

The monomer represented by the formula (C1-2) includes unsaturated monocarboxylic acid monomers such as (meth) acrylic acid and crotonic acid, unsaturated dicarboxylic acid monomers such as maleic acid, itaconic acid and fumaric acid, or their salts, for example alkali metal salts, alkaline earth metal salts, ammonium salts and amine salts, preferably (meth)acrylic acid and its alkali metal salts.

The monomer represented by the formula (C1-3) includes (meth)allylsulfonic acid or its salts, for example alkali metal salts, alkaline earth metal salts, ammonium salts and amine salts.

From the viewpoint of control of the molecular weight of the copolymer, it is more preferable to use, as the monomer (b), only the monomer represented by the formula (C1-2).

The total mount of the monomers (a) and (b) in the monomer mixture constituting the component (C) is 50 wt % or more, more preferably 80 wt % or more, even more preferably 100 wt %. Other copolymerizable monomers than the monomers (a) and (b) include acrylonitrile, alkyl (meth)acrylate, (meth)acrylamide, styrenesulfonic acid, etc.

The component (C) can be produced by methods known in the art. For example, a solution polymerization method in JP-A No. 11-157897 can be mentioned; briefly, the method involves a reaction at 50 to 100° C. for 0.5 to 10 hours with sodium sulfite and mercapto ethanol added in the presence of a polymerization initiator such as ammonium persulfate, hydrogen peroxide or the like in water or a C1 to C4 lower alcohol.

The weight-average molecular weight of the component (C) (gel permeation chromatography/sodium polysulfonate standards in an aqueous system) is preferably in the range of 10,000 to 100,000, particularly preferably 10,000 to 80,000.

When the dispersant for a hydraulic composition which contains the component (C) is used, the dispersant contains the component (C) preferably in an amount of 1 to 50% by weight, more preferably 10 to 40% by weight, even more preferably 20 to 30% by weight. Alternatively, the component (C) is used in the dispersant such that the content of the component (C) in the additive composition for a hydraulic composition in the present invention reaches preferably 10 to 45% by weight, more preferably 10 to 40% by weight, even more preferably 20 to 30% by weight. Generally, the remainder of the dispersant is water, an antifouling agent and other components.

<Additive Composition for a Hydraulic Composition>

The early strengthening agent for a hydraulic composition in the present invention contains the component (A) and is more preferably formed into an additive composition for a hydraulic composition which further contains the component (B). In the additive composition for a hydraulic composition in the present invention, the content of the component (A) in terms of the effective component is preferably 5 to 95% by weight, more preferably 10 to 50% by weight, even more preferably 20 to 30% by weight. The content is preferably 5% by weight or more from the viewpoint of improvement of demolding strength, that is, improvement in early strengthening property and is preferably 95% by weight or less from the viewpoint of the uniform stabilization of products.

In the additive composition for a hydraulic composition in the present invention, the amount of the component (A) added is preferably 0.01 to 1 part by weight based on 100 parts by weight of the hydraulic powder. That is, in the additive composition for a hydraulic composition in the present invention, the component (A) (effective component) is used preferably in an amount of 0.01 to 1% by weight, more preferably 0.05 to 0.5% by weight, even more preferably 0.1 to 0.2% by weight, based on the hydraulic powder.

In the additive composition for a hydraulic composition in the present invention, the content of the component (B), in terms of the concentration of the effective component, is 5 to 50% by weight, more preferably 10 to 40% by weight and even more preferably 20 to 35% by weight. The content of the component (B) is preferably 5% by weight or more from the viewpoint of reduction in mortar viscosity and is preferably 50% by weight or less from the viewpoint of uniform stabilization of products.

In the additive composition for a hydraulic composition in the present invention, the component (B) (effective component) is used preferably in the range of 0.01 to 10% by weight, more preferably 0.1 to 5% by weight and even more preferably 0.2 to 1% by weight based on the hydraulic powder, from the viewpoint of concrete fluidity.

In the additive composition for a hydraulic composition in the present invention, the weight ratio of the total amount of the components (B) to the total amount of the components (A) in terms of the effective components, that is, the weight ratio of the total amount of the components (B)/the total amount of the components (A) [(B)/(A)] is preferably 15/85 to 96/4, more preferably 25/75 to 80/20, even more preferably 40/60 to 80/20, even more preferably 50/50 to 80/20 and further even more preferably 50/50 to 70/30. From the viewpoint of balance between the amount of the component (A) added and the effect of improving early strengthening property and surface texture, (B)/(A) is preferably 90/10 to 60/40, more preferably 85/15 to 50/50, even more preferably 80/20 to 60/40. As used herein, the effective component is used interchangeably with the solid content of the effective component. The effective component is determined by introducing about 3 g of a measurement sample into an aluminum foil cup, measuring its weight, drying it at 105° C. for 2 hours, measuring its weight again, and calculating the solid content of the effective component, based on the change in weight before and after drying.

In the additive composition for a hydraulic composition in the present invention, the total content of the components (A) and (B), in terms of the effective components, is preferably 10 to 100% by weight, more preferably 10 to 60% by weight, even more preferably 20 to 40% by weight, from the viewpoint of handleability of products.

In the additive composition for a hydraulic composition in the present invention, the component (A) (effective component) and the component (B) (effective component) are used preferably in a total amount of 0.1 to 10% by weight, more preferably 0.2 to 5% by weight and even more preferably 0.2 to 1% by weight based on the hydraulic powder, from the viewpoint of early strengthening property and surface texture.

When the additive composition for a hydraulic composition in the present invention further contains the component (C), the component (C) (effective component) is used in an amount of 0.01 to 10% by weight, more preferably 0.1 to 5% by weight and even more preferably 0.2 to 1% by weight based on the hydraulic powder, from the viewpoint of improving the fluidity of concrete.

When the additive composition for a hydraulic composition in the present invention further contains the component (C), the total content of the components (B) and (C) in the composition is preferably 5 to 50% by weight, more preferably 10 to 40% by weight, from the viewpoint of improving the fluidity of concrete. In this case, the component (B)/component (C) weight ratio ((B)/(C)), in terms of the effective components, is preferably 100/1 to 100/80. The upper content of the component (C) is established within this weight ratio such that (B)/(C) is preferably 100/65, more preferably 100/40, even more preferably 100/25. On the other hand, the lower content of the component (C) is established such that (B)/(C) is preferably 100/3, more preferably 100/10.

The additive composition for a hydraulic composition in the present invention is used in every inorganic hydraulic powder showing curability by hydration reaction, including every kind of cement. The additive composition for a hydraulic composition in the present invention may be in a powdery or liquid form. In the case of a liquid form, the additive composition is preferably one using water as solvent or as dispersion medium (an aqueous solution, etc.) from the viewpoint of workability and reduction of environmental burdens.

The cement includes normal Portland cement, rapid-hardening Portland cement, ultra-rapid-hardening Portland cement and ecocement (for example JIS R5214, etc.). The additive composition of the present invention may contain blast furnace slag, fly ash, silica fume, etc. as hydraulic powder other than cement, or may contain non-hydraulic fine limestone powder, etc. Silica fume cement or blast furnace cement, which is mixed with cement, may also be used.

The additive composition for a hydraulic composition in the present invention may contain other additives (materials). Examples of such additives include AE agents such as a resin soap, saturated or unsaturated fatty acid, sodium hydroxystearate, lauryl sulfate, alkylbenzenesulfonic acid (salt), alkane sulfonate, polyoxyalkylene alkyl (phenyl)ether, polyoxyalkylene alkyl (phenyl)ether sulfate (salt), polyoxyalkylene alkyl (phenyl)ether phosphate (salt), protein material, alkenylsuccinic acid and α-olefin sulfonate; retardants such as an oxycarboxylic acid type, e.g., gluconic acid, glucoheptonic acid, arabonic acid, malic acid and citric acid, saccharide type such as dextrin, monosaccharides, oligosaccharides and polysaccharides and sugar alcohol type; air entraining agents; thickeners; silica sand; AE water reducing agents; early strengthening agents or promoters such as soluble calcium salts, e.g., calcium chloride, calcium nitrite, calcium nitrate, calcium bromide and calcium iodide, chlorides, e.g., iron chloride and magnesium chloride, sulfates, potassium hydroxide, sodium hydroxide, carbonates, thiosulfates, formic acid (salt) and alkanolamine; foaming agents; waterproof agents such as resinous acid (salt), fatty acid esters, fats and oils, silicone, paraffin, asphalt and wax; blast-furnace slag; fluidizing agents; antifoaming agents such as a dimethylpolysiloxane type, polyalkylene glycol fatty acid ester type, mineral oil type, fat and oil type, oxyalkylene type, alcohol type and amide type; foaming preventives; fly ash; high-performance water-reducing agents such as a melaminesulfonic acid formalin condensate type and aminosulfonic acid type; silica fume; rust preventives such as nitrites, phosphates and zinc oxide; water-soluble polymers such as a cellulose type, e.g., methyl cellulose and hydroxyethyl cellulose, natural product type, e.g., β-1,3-glucan and xanthane gum and synthetic type, e.g., polyacrylic acid amide, polyethylene glycol and EO adducts of oleyl alcohol or reaction products of these EO adducts and vinylcyclohexenediepoxide; and emulsions of polymers such as alkyl(meth)acrylates. These components may be blended in a dispersant for a hydraulic composition.

The additive composition for a hydraulic composition in the present invention preferably contains, among those materials described above, the antifoaming agent, more preferably dimethylpolysiloxane or polyalkylene glycol fatty acid ester.

The additive composition for a hydraulic composition in the present invention is useful in the fields of ready-mixed concrete and concrete vibration products and also in all other various concrete fields such as self-leveling concrete, flame retardant concrete products, plaster concrete, gypsum slurry concrete, light-weight concrete or heavy-weight concrete, AE concrete, repairing concrete, prepacked concrete, tremie concrete, foundation improvement concrete, grout concrete, and concretes used in freezing weather.

<Hydraulic Composition>

The present invention provides a hydraulic composition containing the early strengthening agent for a hydraulic composition or the additive composition for a hydraulic composition in the present invention, hydraulic powder, and water.

The hydraulic composition of the present invention is a paste, mortar, concrete or the like containing water and hydraulic powder (cement) and may contain aggregate. The aggregate includes fine aggregate and coarse aggregate, and the fine aggregate is preferably mountain sand, land sand, river sand or crushed sand, and the coarse aggregate is preferably mountain gravel, land gravel, river gravel or crushed stone. Depending on the use, light-weight aggregate may also be used. These terms of aggregate are in accordance with Comprehensive Bibliography of Concrete (in Japanese) (published on Jun. 10, 1998 by Gijyutsu Shoin). The hydraulic composition can give sufficient strength to concrete upon demolding for example even after curing in air even in a short period of about 1 day in a mold and the product is excellent in surface texture, and thus the hydraulic composition is preferable for production of cured products (molded products) of the hydraulic composition, such as concrete products. The molded products include vibrated molded products such as culverts, side ditches and segments and centrifuged molded products such as poles, piles and fume tubes. In the vibrated molded products, the surface thereof charged into a concrete form is finished smoothly to attain a beautiful external appearance by using the hydraulic composition. For the centrifuged molded products, those excellent in chargeability can be obtained.

In the hydraulic composition, the water/hydraulic powder ratio (weight ratio (weight %) of water to hydraulic powder in slurry, abbreviated as W/P in usual and as W/C when the powder is cement) is preferably 65% by weight or less, more preferably 60% by weight or less, even more preferably 55% by weight or less and even more preferably 50% by weight or less. The lower limit of the W/P ratio is preferably 20% by weight or more, more preferably 30% by weight or more. Accordingly, the W/P ratio is preferably in the range of 20 to 65% by weight, more preferably 20 to 60% by weight, even more preferably 30 to 55% by weight and even more preferably 30 to 50% by weight.

When the hydraulic composition of the present invention contains fine aggregate and coarse aggregate, the fine aggregate percentage (s/a) is preferably 35 to 55% by volume, more preferably 40 to 50% by volume. Based on the volumes of fine aggregate (S) and coarse aggregate (G), s/a is calculated according to s/a=[S/(S+G)]×100 (volume %). The hydraulic composition preferably contains 600 to 800 kg, particularly 650 to 750 kg, of fine aggregate per $m^3$ of the uncured hydraulic composition (the hydraulic composition in a fresh state) and 800 to 1200 kg, particularly 900 to 1100 kg, of coarse aggregate per $m^3$ of the uncured hydraulic composition (the hydraulic composition in a fresh state).

The hydraulic composition of the present invention can be charged into a form or the like by applying vibration acceleration. The vibration method used in charging may be any method of vibrating the composition on a table, in a form, internally, or superficially. Concrete if highly flowable can be charged without vibration. Application of vibration acceleration to the hydraulic composition of the present invention is preferable when the concrete is charged into a form to produce a molded product, etc. The hydraulic composition of the present invention can also be compacted by centrifugal molding.

For example, the hydraulic composition of the present invention is kneaded, then charged into a form with or without vibration, thereafter cured under specific curing conditions and removed from the form, thereby serving as a concrete product. The strength necessary for removal of the concrete product from the form, although varying depending on the type of the product, is preferably 5 to 20 N/mm². For attaining such strength, the process preferably has a curing step after charging into a form. In the curing step, steam curing (promotion of strength by heating) is preferably conducted. The curing time is preferably 8 to 20 hours. Curing is carried out for example by a method under the following conditions: the time in which the hydraulic composition is previously left until steam curing is curried out is 0 to 4 hours; the temperature rise rate after introduction into steam is 5 to 30° C./hr.; the top temperature is 40 to 70° C.; the retention time at the top temperature is 0.5 to 6 hours, followed by natural cooling by termination of steam introduction.

The hydraulic composition of the present invention can rapidly attain sufficient strength for demolding and is excellent in surface texture, thus enabling decrease in the top temperature and reduction in retention time at the top temperature, resulting in reduction in the amount of steam used (energy cost). It is estimated that depending on concrete mix and curing conditions, concrete products can be produced for example by curing in air without necessity for steam curing. It is also estimated that by using the hydraulic composition of the present invention, concrete products having sufficient strength for demolding and being excellent in surface texture can be obtained under the curing conditions where the time in which the composition is previously left until steam curing is curried out is 2 to 4 hours; the temperature rise rate is 10 to 20° C./hr.; the top temperature is 40 to 60° C., followed by natural cooling, and it is expected that the retention time can be reduced by about 25 to 100%.

BRIEF DESCRIPTION OF THE DRAWING

FIG. 1 is a schematic view showing a hexagonal cylinder form used in evaluation of surface texture in the Examples and Comparative Examples.

EXAMPLES

The present invention is described in detail with reference to the Examples. The Examples are merely illustrative of the present invention and are not intended to limit the present invention.

<Additive Composition for Hydraulic Composition>

(1) Alkylene Oxide Adduct to Glycerin

Tables 1 and 2 show a compound distribution of glycerin/EO adducts (mixture) used as a part of the component (A) in the Examples and Comparative Examples below. Among the mixtures in Tables 1 and 2, A-7 (EOp=1.0) is obtained in Production Example 1 below, and similarly A-4 (EOp=0.5), A-13 (EOp=1.5), A-21 (EOp=2.1) and A-23 (EOp=3.0) were obtained. As used herein, "EOp" is the average number of moles of ethylene oxide added and means the average of the sum in total of m1, m2 and m3. Other mixtures were prepared by mixing glycerin with the glycerin/ethylene oxide adducts of known EOp obtained in the production examples such that the mixtures had predetermined EOp.

Production Example 1

Production of Glycerin/Ethylene Oxide Adduct A-7

230.3 g of glycerin and 1.4 g of KOH were introduced into a 2-L autoclave and then heated to 130° C. at a stirring speed of about 600 rpm. Then, the mixture was dehydrated under the conditions of 130° C. and 1.3 kPa for 30 minutes. Thereafter, the reaction mixture was heated to 155° C. The reaction mixture was reacted with ethylene oxide (hereinafter, referred to as EO) in an amount of 110.1 g (that is, EO in an amount of 1 mole per mole of glycerin). This reaction was carried out under the conditions where the temperature was 155° C. and the pressure was 0.1 to 0.3 MPa (gauge pressure). After a predetermined amount of EO was introduced, no drop in the pressure came to be observed (after the reaction was finished), and then the reaction mixture was cooled to a temperature of 80° C. to give the glycerin adducts in which 1 mole of EO had been added on average (A-7 in the table). EO in these adducts was distributed as follows: unreacted glycerin (EO=0 mole), 36% (% is on a weight basis); the glycerin to which 1 mole of EO had been added, 37%; the glycerin to which 2 moles of EO had been added, 19%; the glycerin to which 3 moles of EO had been added, 6%; and the glycerin to which 4 or more moles of EO had been added, 2%.

The compound distribution of the glycerin/EO adducts was analyzed by gas chromatography under the following conditions:

Column: Frontier UA-1, length 15 m, inner diameter 250 μm, column film thickness 0.15 μm
Carrier gas: helium
Column temperature: temperature rise conditions; initiation temperature 60° C., end temperature 350° C., temperature rise rate 10° C./m
Detector: FID
Detection temperature: 350° C.

Production Example 2

Production of Glycerin Adducts in which 1 Mole of Propylene Oxide was Added on Average 230.3 g of glycerin and 4.2 g of KOH were introduced into a 2-L autoclave and then heated to 130° C. at a stirring speed of about 600 rpm. Then, the mixture was dehydrated under the conditions of 130° C. and 1.3 kPa for 30 minutes. The reaction mixture was reacted with propylene oxide (hereinafter, referred to as PO) in an amount of 145.2 g (that is, PO in an amount of 1 mole per mole of glycerin). This reaction was carried out under the conditions where the temperature was 130° C. and the pressure was 0.1 to 0.3 MPa (gauge pressure). After the reaction was finished, the reaction mixture was cooled to a temperature of 80° C. to give the glycerin adducts in which 1 mole of propylene oxide was added on average (glycerin PO1 in the table). PO in these adducts was distributed as follows: unreacted glycerin (PO=0 mole), 26.3% (% is on a weight basis); the glycerin to which 1 mole of PO had been added, 44.0%; the glycerin to which 2 moles of PO had been added, 23.9%; the glycerin to which 3 moles of PO had been added, 4.6%; and the glycerin to which 4 moles of PO had been added, 0.2%.

(3) Mixture (A3-1)

A mixture (A3-1) containing the compounds represented by the general formula (A3) was produced by the following method.

(2-1) Production of a Catalyst 9.9 g of ethylphosphonic acid, 27.7 g of 85% orthophosphoric acid and 112.5 g of aluminum nitrate (nonahydrate) were dissolved in 1000 g of water. An aqueous ammonia solution was added dropwise to the mixed solution at room temperature (25° C.) to raise the pH of the solution to 5. During this reaction, gel-like white precipitates were generated. The precipitates were filtered, washed with water, dried at 110° C. for 15 hours, and crushed into sizes of 60 mesh or less. To the crushed catalyst was added 10% of alumina sol. The crushed catalyst was then extrusion-molded into a size of 1.5 mmφ. The product was calcinated at 250° C. for 3 hours to give a molded solid acid catalyst (hereinafter, referred to as catalyst 1). The weak acid point of the resulting catalyst was 1 mmol/g and the strong acid point thereof was below detection limits. As used herein, the weak acid point is a point at which desorption of $NH_3$ occurs in the range of 100 to 250° C. in an ammonia adsorption-desorption process, and the strong

TABLE 1

| | | EO adducts to glycerin | | | | | | | | | | | |
|---|---|---|---|---|---|---|---|---|---|---|---|---|---|
| | | Comparative A-1 | Comparative A-2 | Comparative A-3 | A-1 | A-2 | A-3 | A-4 | A-5 | A-6 | A-7 | A-8 | A-9 |
| Average number of the total of m1, m2 and m3 | | 0 | 0.4 | 3.2 | 2.3 | 2.1 | 2.4 | 0.5 | 0.7 | 0.9 | 1.0 | 1.2 | 1.5 |
| Distribution of EO adducts (weight %) | 0 mole | 100 | 63 | 2 | 22 | 29 | 20 | 57 | 49 | 41 | 36 | 31 | 23 |
| | 1 mole | 0 | 28 | 7 | 9 | 16 | 11 | 32 | 31 | 36 | 37 | 34 | 31 |
| | 2 moles | 0 | 8 | 15 | 21 | 4 | 12 | 9 | 15 | 17 | 19 | 21 | 24 |
| | 3 moles | 0 | 1 | 17 | 19 | 15 | 19 | 2 | 4 | 5 | 6 | 9 | 14 |
| | 4 moles or more | 0 | 0 | 59 | 29 | 36 | 38 | 0 | 1 | 1 | 2 | 5 | 8 |
| | Total | 100.0 | 100.0 | 100.0 | 100.0 | 100.0 | 100.0 | 100.0 | 100.0 | 100.0 | 100.0 | 100.0 | 100.0 |
| Total of 1- to 3-mole adducts* (wt %) | | 0 | 37 | 39 | 49 | 35 | 42 | 43 | 50 | 58 | 62 | 64 | 69 |

*The total content (wt %) of the glycerin/1- to 3-mole EO adducts in all glycerin/EO adducts (this is applied hereinbelow)

TABLE 2

| | | EO adducts to glycerin | | | | | | | | | | | | |
|---|---|---|---|---|---|---|---|---|---|---|---|---|---|---|
| | | A-10 | A-11 | A-12 | A-13 | A-14 | A-15 | A-16 | A-17 | A-18 | A-19 | A-20 | A-21 | A-22 | A-23 |
| Average number of the total of m1, m2 and m3 | | 2.0 | 2.2 | 1.9 | 1.5 | 2.0 | 2.1 | 1.9 | 1.8 | 1.0 | 1.4 | 1.6 | 2.1 | 2.5 | 3.0 |
| Distribution of EO adducts (weight %) | 0 mole | 10 | 18 | 19 | 20 | 24 | 19 | 19 | 15 | 35 | 27 | 18 | 11 | 7 | 3 |
| | 1 mole | 24 | 15 | 24 | 35 | 25 | 24 | 24 | 29 | 37 | 32 | 32 | 24 | 18 | 11 |
| | 2 moles | 29 | 19 | 21 | 27 | 7 | 13 | 21 | 28 | 20 | 24 | 28 | 29 | 25 | 22 |
| | 3 moles | 21 | 19 | 16 | 13 | 18 | 16 | 16 | 18 | 5 | 10 | 15 | 21 | 23 | 26 |
| | 4 moles or more | 16 | 29 | 20 | 5 | 26 | 28 | 20 | 10 | 3 | 7 | 7 | 15 | 27 | 38 |
| | Total | 100.0 | 100.0 | 100.0 | 100.0 | 100.0 | 100.0 | 100.0 | 100.0 | 100.0 | 100.0 | 100.0 | 100.0 | 100.0 | 100.0 |
| Total of 1- to 3-mole adducts (wt %) | | 74 | 53 | 61 | 75 | 50 | 53 | 61 | 75 | 62 | 66 | 75 | 74 | 66 | 59 | acid point is a point at which desorption of $NH_3$ occurs in the range of higher than 250° C. in the ammonia adsorption-desorption process.

(2-2) Production of Mixture (A3-1)

Step 1: Esterification

Two tube reactors each having an inner diameter of 35.5 mmφ and a length of 800 mmH, having a tube of 6 mm in inner diameter for temperature measurement in the axial direction, were connected in series, and each tube was packed with 500 cm³ catalyst 1. Coconut oil having an acid value of 0.3 mg KOH/g was used as fats and oils, and fed together with methanol (first grade reagent manufactured by Kanto Chemical Co., Ltd.) into the top of the reactor and reacted at a reaction temperature of 170° C. at a liquid hourly space velocity (LHSV) of 0.2/h and at a reaction pressure of 3.0 MPa. The molar amount of methanol fed was 10 times as much as the molar amount of the fats and oils, whereby a reaction mixture was obtained.

Step 2: Oil-Water Separation 500 g of the reaction mixture obtained in step 1 and 50 g of water were added to a 1000-ml separating funnel, then shaken and left at 25° C. for 30 minutes, thereby being separated into a glycerin phase (aqueous phase) and an oil phase.

Step 3: Recovery of the Mixture (A3-1) Containing the Compounds Represented by the General Formula (A3)

The glycerin phase obtained in step 2 was introduced into a 200-ml flask and distilled at 9 kPa and 120° C., thereby removing methanol and water. Thereafter, the sample was further distilled at 0.1 kPa and 180° C. to produce a mixture (A3-1) having an acid value of 0.76 mg KOH/g as a distillate.

The resulting mixture (A3-1) was quantified for the compounds of the general formula (A3), etc. by gas chromatography (OVI-G43 column manufactured by Supelco).

The composition of the mixture (A3-1) was as follows:
3-Methoxypropane-1,2-diol: 67.9% by weight
2-Methoxypropane-1,3-diol: 21.9% by weight
1,2,3-Propanetriol: 2.1% by weight
Others: 8.1% by weight (3) Comparative Production Example Comparative Production Example 1

Production of C6 Glyceryl Ether

A glass reaction container (four-neck flask) equipped with a stirrer was charged with 162 g (9 moles) of water, 52 g (0.25 mole) of lauric acid and 6.7 g (0.12 mole) of potassium hydroxide, the atmosphere in the reactor was substituted with nitrogen under stirring, and the temperature of the mixture was raised to 90° C. 494 g (3 moles) of hexyl glycidyl ether (purity 96%) was added dropwise to the mixture over 4 hours. Thereafter, the mixture was aged at 90° C. for 20 hours, and then 6.7 g (0.12 mole) of potassium hydroxide was introduced into the reaction container. Thereafter, the water was distilled away at 90° C. and 10 kPa, and the reaction mixture was further distilled to give hexyl glyceryl ether (expressed in the table as C6 glyceryl ether) (purity: 95%).

(4) Component (B)

As the component (B), copolymers B-1 to B-6 obtained by Production Examples B-1 to B-6 below were used.

Production Example B-1

Production of Copolymer B-1

A glass reaction container (four-neck flask) equipped with a stirrer was charged with 355 g of water, the atmosphere in the reactor was substituted with nitrogen under stirring, and the temperature of the water was raised to 80° C. A solution in which 509 g of 60 weight % aqueous ω-methoxypolyethylene glycol monomethacrylate (number of moles of ethylene oxide added on average: 120; ester purity: 97%), 35.6 g of Phosmer M (a mixture of mono(2-hydroxyethyl)methacrylic acid phosphate ester and di(2-hydroxyethyl)methacrylic acid phosphate ester, manufactured by Unichemical) and 2.0 g of mercaptopropionic acid had been mixed and dissolved, and a solution prepared by dissolving 2.9 g of ammonium persulfate in 45 g of water, were respectively added dropwise to the above reaction container over 1.5 hours. Thereafter, the mixture was aged for 1 hour, and then a solution prepared by dissolving 0.6 g of ammonium persulfate in 15 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less and then neutralized with 35.0 g of 30% sodium hydroxide solution to give a copolymer having a molecular weight of 48000. Thereafter, the solid content of the product was adjusted to 20% with deionized water.

Production Example B-2

Production of Copolymer B-2

A glass reaction container (four-neck flask) equipped with a stirrer was charged with 395 g of water, the atmosphere in the reactor was substituted with nitrogen under stirring, and the temperature of the water was raised to 80° C. A solution prepared by mixing and dissolving 261 g of ω-methoxypolyethylene glycol monomethacrylate (number of moles of ethylene oxide added on average: 23; NK Ester M230G manufactured by Shin-Nakamura Chemical Co., Ltd.), 67.3 g of Phosmer M (a mixture of mono(2-hydroxyethyl)methacrylic acid phosphate ester and di(2-hydroxyethyl)methacrylic acid phosphate ester, manufactured by Unichemical) and 4.3 g of mercaptopropionic acid in 141 g of water, and a solution prepared by dissolving 8.0 g of ammonium persulfate in 45 g of water, were respectively added dropwise to the reaction container over 1.5 hours. Thereafter, the mixture was aged for 1 hour, and then a solution prepared by dissolving 1.8 g of ammonium persulfate in 10 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less and then neutralized with 66 g of 30% sodium hydroxide solution to give a copolymer having a molecular weight of 37000. Thereafter, the solid content of the product was adjusted to 20% with deionized water.

Production Example B-3

Production of Copolymer B-3

A glass reaction container (four-neck flask) equipped with a stirrer was charged with 415 g of water, the atmosphere in the reactor was substituted with nitrogen under stirring, and the temperature of the water was raised to 80° C. A solution prepared by mixing and dissolving 230 g of ω-methoxypolyethylene glycol monomethacrylate (number of moles of ethylene oxide added on average: 9; NK Ester M90G manufactured by Shin-Nakamura Chemical Co., Ltd.), 88 g of Phosmer M (a mixture of mono(2-hydroxyethyl)methacrylic acid phosphate ester and di(2-hydroxyethyl)methacrylic acid phosphate ester, manufactured by Unichemical) and 10.6 g of mercaptopropionic acid in 93 g of water, and a solution prepared by dissolving 7.7 g of ammonium persulfate in 45 g of water, were respectively added dropwise to the reaction container over 1.5 hours. Thereafter, the mixture was aged for 1 hour, and then a solution prepared by dissolving 3.1 g of ammonium persulfate in 15 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less and then neutralized with 88 g of 30% sodium hydroxide solution to give a copolymer having a molecular weight of 25000. Thereafter, the solid content of the product was adjusted to 20% with deionized water.

Production Example B-4

Production of Copolymer B-4

A glass reaction container (four-neck flask) equipped with a stirrer was charged with 395 g of water, the atmosphere in the reactor was substituted with nitrogen under stirring, and the temperature of the water was raised to 80° C. A solution in which 57.5 g of ω-methoxypolyethylene glycol monomethacrylate (number of moles of ethylene oxide added on average: 9; NK Ester M90G manufactured by Shin-Nakamura Chemical Co., Ltd.), 431 g of 60 weight % aqueous ω-methoxypolyethylene glycol monomethacrylate (number of moles of ethylene oxide added on average: 120; ester purity: 97%), 24.3 g of Phosmer M (a mixture of mono(2-hydroxyethyl)methacrylic acid phosphate ester and di(2-hydroxyethyl)methacrylic acid phosphate ester, manufactured by Unichemical) and 2.95 g of mercaptopropionic acid had been mixed and dissolved, and a solution prepared by dissolving 2.64 g of ammonium persulfate in 45 g of water, were respectively added dropwise to the reaction container over 1.5 hours. Thereafter, the mixture was aged for 1 hour, and then a solution prepared by dissolving 1.06 g of ammonium persulfate in 15 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less and then neutralized with 25 g of 30% sodium hydroxide solution to give a copolymer having a molecular weight of 48000. Thereafter, the solid content of the product was adjusted to 20%; with deionized water.

Production Example B-5

Production of Copolymer B-5

A glass reaction container (four-neck flask) equipped with a stirrer was charged with 387 g of water, the atmosphere in the reactor was substituted with nitrogen under stirring, and the temperature of the water was raised to 80° C. A solution prepared by mixing and dissolving 234 g of ω-methoxypolyethylene glycol monomethacrylate (number of moles of ethylene oxide added on average: 23; NK Ester M230G manufactured by Shin-Nakamura Chemical Co., Ltd.), 90.0 g of Phosmer M (a mixture of mono(2-hydroxyethyl)methacrylic acid phosphate ester and di(2-hydroxyethyl)methacrylic acid phosphate ester, manufactured by Unichemical) and 5.0 g of mercaptopropionic acid in 126 g of water, and a solution prepared by dissolving 8.7 g of ammonium persulfate in 50 g of water, were respectively added dropwise to the reaction container over 1.5 hours. Thereafter, the mixture was aged for 1 hour, and then a solution prepared by dissolving 1.9 g of ammonium persulfate in 11 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less and then neutralized with 88 g of 30% sodium hydroxide solution to give a copolymer having a molecular weight of 37000. Thereafter, the solid content of the product was adjusted to 20% with deionized water.

Production Example B-6

Production of Copolymer B-6

A glass reaction container (four-neck flask) equipped with a stirrer was charged with 314 g of water and 109 g of polyoxyethylene (30 moles) allyl ether, the atmosphere in the reactor was substituted with nitrogen under stirring, and the temperature of the water was raised to 80° C. A solution prepared by mixing and dissolving 102.5 g of Phosmer M (a mixture of mono(2-hydroxyethyl)methacrylic acid phosphate ester and di(2-hydroxyethyl)methacrylic acid phosphate ester, manufactured by Unichemical) and 4.78 g of mercaptopropionic acid in 114 g of water, and a solution prepared by dissolving 10.3 g of ammonium persulfate in 90 g of water, were respectively added dropwise to the reaction container over 2.5 hours. Thereafter, the mixture was aged for 2 hours, and then a solution prepared by dissolving 3.1 g of ammonium persulfate in 45 g of water was added dropwise over 60 minutes to the mixture which was then aged for 2 hours. During a series of these reactions, the temperature of the reaction system was kept at 80° C. After aging was finished, the reaction mixture was cooled to 40° C. or less and then neutralized with 99 g of 30% sodium hydroxide solution to give a copolymer having a molecular weight of 32000. Thereafter, the solid content of the product was adjusted to 20% with deionized water.

(5) Component (C)

Copolymers C-1 to C-2 obtained in Production Examples C-1 to C-2 below were used as the component (C).

Production Example C-1

Production of Copolymer C-1

A glass reaction container (four-neck flask) equipped with a stirrer was charged with 223 g of water, the atmosphere in the reactor was substituted with nitrogen under stirring, and the temperature of the water was raised to 80° C. A solution in which 630 g of 60 weight % aqueous co-methoxypolyethylene glycol monomethacrylate (number of moles of ethylene oxide added on average: 120; ester purity: 97%), 13.6 g of methacrylic acid and 1.3 g of mercaptoethanol had been mixed and dissolved, and a solution prepared by dissolving 2.6 g of ammonium persulfate in 90 g of water, were respectively added dropwise to the reaction container over 1.5 hours. Thereafter, the mixture was aged for 1 hour, and then a solution prepared by dissolving 1.0 g of ammonium persulfate in 30 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less and then neutralized with 9.2 g of 48% sodium hydroxide solution to give a copolymer having a molecular weight of 68000. Thereafter, the solid content of the product was adjusted to 20% with deionized water.

Production Example C-2

Production of Copolymer C-2

A glass reaction container (four-neck flask) equipped with a stirrer was charged with 333 g of water, the atmosphere in the reactor was substituted with nitrogen under stirring, and the temperature of the water was raised to 80° C. A solution prepared by mixing and dissolving 300 g of ω-methoxypolyethylene glycol monomethacrylate (number of moles of ethylene oxide added on average: 23; NK Ester M230G manufactured by Shin-Nakamura Chemical Co., Ltd.), 69.7 g of methacrylic acid (reagent: Wako Pure Chemical Industries, Ltd.) and 6.3 g of mercaptopropionic acid in 200 g of water, and a solution prepared by dissolving 12.3 g of ammonium persulfate in 45 g of water, were respectively added dropwise to the reaction container over 1.5 hours. Thereafter, the mixture was aged for 1 hour, and then a solution prepared by dissolving 4.9 g of ammonium persulfate in 15 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less and then neutralized with 50.2 g of 48% sodium hydroxide solution to give a copolymer having a molecular weight of 43000. Thereafter, the solid content of the product was adjusted to 20% with deionized water.

The copolymers B-1 to B-6 and C-1 and C-2 obtained above are summarized in Table 3.

In Table 3, number shown in parentheses for the monomer 1 is the average number of moles of ethylene oxide added on average. "mol %" is mol % of a constituent component (monomer) in a copolymer.

<Preparation and Evaluation of Concrete>

(1) Preparation of Concrete

Under the compounding conditions shown in Table 4, cement (C), fine aggregate (S), and coarse aggregate (G1, G2) were introduced into a 30-L forced biaxial mixer (manufactured by IHI) and then dry-mixed for 10 seconds. Then, kneading water (W) containing the additive composition for a hydraulic composition (used as an aqueous solution with a solid content of 20% by weight), an air-entraining agent (trade name: AE03, manufactured by Kao Corporation; the primary component, polyoxyethylene lauryl ether sulfate) and an antifoaming agent (trade name: Antifoaming Agent No. 21, manufactured by Kao Corporation; the primary component, fatty acid esters) was added to the dry-kneaded mixture such that the objective slump of 21±1 cm was reached and the objective entrained air amount of 3±1% was reached. After pouring the kneading water, the mixture was kneaded for 90 seconds. The amount of the additive composition for a hydraulic composition was regulated such that the above slump value was reached. In addition, the amounts of the air-entraining agent and the antifoaming agent were regulated such that the above amount of air entrained was reached. Formulations (concentrations of the effective components) of the additive compositions for hydraulic compositions are as shown in Tables 5 to 9 (the balance: water) and were added in the amounts shown in Tables 5 to 9 to the kneading water.

TABLE 3

| | Copolymer | | | | | | | |
|---|---|---|---|---|---|---|---|---|
| | monomer 1 or monomer(a) | | | | monomer 2 and monomer 3 | | Monomer(b) | |
| No. | Kind | mole % | Kind | mole % | Kind | mole % | Kind | mole % |
| B-1 | Methoxypolyethylene glycol (120) monomethacrylate | 35 | — | — | Mixture of mono(2-hydroxyethyl) methacrylic acid phosphate ester and di(2-hydroxyethyl)methacrylic acid phosphate ester (Phosmer M) | 65 | — | — |
| B-2 | Methoxypolyethylene glycol (23) monomethacrylate | 55 | — | — | Mixture of mono(2-hydroxyethyl) methacrylic acid phosphate ester and di(2-hydroxyethyl)methacrylic acid phosphate ester (Phosmer M) | 45 | — | — |
| B-3 | methoxypolyethylene glycol (9) monomethacrylate | 65 | — | — | Mixture of mono(2-hydroxyethyl) methacrylic acid phosphate ester and di(2-hydroxyethyl)methacrylic acid phosphate ester (Phosmer M) | 35 | — | — |
| B-4 | methoxypolyethylene glycol(120) monomethacrylate | 20 | methoxypolyethylene glycol(9) monomethacrylate | 50 | Mixture of mono(2-hydroxyethyl) methacrylic acid phosphate ester and di(2-hydroxyethyl)methacrylic acid phosphate ester (Phosmer M) | 30 | — | — |
| B-5 | methoxypolyethylene glycol (23) monomethacrylate | 45 | — | — | Mixture of mono(2-hydroxyethyl) methacrylic acid phosphate ester and di(2-hydroxyethyl)methacrylic acid phosphate ester (Phosmer M) | 55 | — | — |
| B-6 | Polyoxyethylene (30) allyl ether | 35 | — | — | Mixture of mono(2-hydroxyethyl) methacrylic acid phosphate ester and di(2-hydroxyethyl)methacrylic acid phosphate ester (Phosmer M) | 65 | — | — |
| C-1 | Methoxypolyethylene glycol (120) monomethacrylate | 30 | — | — | — | — | Methacrylic acid | 70 |
| C-2 | Methoxypolyethylene glycol (23) monomethacrylate | 25 | — | — | — | — | Methacrylic acid | 75 |

TABLE 4

| W/C (wt %) | s/a (volume %) | Unit amount (kg/m³) | | | | | Set amount of air (volume %) |
|---|---|---|---|---|---|---|---|
| | | W | C | S | G1 | G2 | |
| 40.0 | 42.0 | 165 | 413 | 735 | 413 | 619 | 2.0 |

Cement (C): Normal Portland cement (mixture of normal Portland cement manufactured by Taiheiyo Cement Corporation and normal Portland cement manufactured by Sumitomo Osaka Cement Co., Ltd. (1:1 by weight), density 3.16)

Fine aggregate (S): land sand from Joyo, FM-2.67, density 2.56

Coarse aggregate (G1): crushed stone 2010 from Ibaraki Pref., density 2.60

Coarse aggregate (G2): crushed stone 1005 from Ibaraki Pref., density 2.60

Water (W): tap water (2) Evaluation of Concrete

The concrete (fresh concrete) was evaluated for its demolding strength, surface texture, low-foaming property and mortar viscosity, respectively. The evaluation results are shown in Tables 5 to 9.

(2-1) Evaluation of Demolding Strength

In compliance with JIS A 1132, the concrete was charged into a cylindrical plastic mold (bottom diameter 10 cm; height 20 cm) in a two-layer packaging system and cured in air for 20 hours in a room at 20° C. to prepare a test sample, and the compressive strength of the test sample was measured in compliance with JIS A 1108.

(2-2) Evaluation of Surface Texture

A hexagonal cylinder form that was laid down and could be divided into two in a longer direction (see FIG. 1), which was previously coated with a releasing agent (Liner Seven 90F, Kao Corporation), was charged with the fresh concrete in a 2-layer packaging system by a stabbing bar (each layer: stabbed 10 times) and then vibrated for 30 seconds with a table-type vibrator (C-271a, frequency (vpm) 50 Hz: 2850/60 Hz: 3450, manufactured by Nishinihon Shikenki Co., Ltd.) and cured in air for 24 hours in a room (20° C.), and then the resulting concrete molding was removed from the form. Among the sides of the concrete molding, 7 sides excluding the casting side (that is, the charging side (1) in FIG. 1) were observed visually to count voids with a diameter of about 2 mm or more thereon. The total number of voids on the 7 sides per molding was determined, and the average number of voids on 3 moldings was determined. According to this average number, the surface texture of the concrete was rated in order of a good surface texture as follows: A, less than 20 voids; B, 20 or more and less than 30 voids; C, 30 or more and less than 50 voids; and D, 50 or more voids.

(2-3) Evaluation of Low-Foaming Property 50 mL of 0.5 wt % aqueous additive composition solution (aqueous solution containing the components (A) and (B) at a total concentration of 0.5 wt % in terms of the effective components in the table) is introduced into a measuring cylinder (200 mL) equipped with a stopper and then vertically shaken 20 times strongly by hand, and immediately thereafter, the amount of foam therein is measured. A is given when the amount of foam is 50 mL or less; B, when the amount is more than 50 mL and 100 mL or less; and C, when the amount is more than 100 mL. A smaller amount of foam is indicative of higher low-foaming property. When the amount of foam is large, the number of projections and depressions on the surface of cured concrete tends to increase even if the amount of foam in concrete is regulated in a stipulated range by an antifoaming agent at the time of preparing the concrete.

(2-4) Measurement of Mortar Viscosity

The fresh concrete was sieved through a sieve having 5-mm openings to give a mortar sample from which coarse aggregate (G) had been removed. Using a mortar dropping time measuring apparatus containing an inverted conical cylinder of 300 mm in length with an upper inlet opening of 100 mm in diameter and a lower discharge opening of 20 mm in diameter, the resulting mortar was charged (in a predetermined amount) into the apparatus with the discharge opening closed with a rubber stopper until the mortar reached the level of the inlet opening. Then, the rubber stopper was removed from the discharge opening, and the time elapsed until the whole of the mortar was discharged was determined (see Examples 1 to 6, etc. in JP-A No. 2001-215185).

TABLE 5

| | | Component (A) | | Copolymer | | Demolding strength (N/mm²) | Surface texture | Low-foaming property | Mortar viscosity (second) |
|---|---|---|---|---|---|---|---|---|---|
| | | Kind | Dosage (wt %) | Kind | Dosage (wt %) | | | | |
| Comparative example | 1-1 | — | — | Copolymer B-1 | 0.2 | 12.7 | D | A | 6.2 |
| | 1-2 | Comparative A-1 | 0.2 | Copolymer B-1 | 0.2 | 12.3 | D | A | 6.2 |
| | 1-3 | Comparative A-3 | 0.2 | Copolymer B-1 | 0.2 | 12.6 | D | C | 6.2 |
| | 1-4 | Butanol | 0.2 | Copolymer B-1 | 0.2 | 12.8 | D | A | 6.0 |
| | 1-5 | 1,3-Butanediol | 0.2 | Copolymer B-1 | 0.2 | 12.7 | D | A | 6.1 |
| | 1-6 | Butyl diglycol | 0.2 | Copolymer B-1 | 0.2 | 12.6 | D | C | 6.0 |
| | 1-7 | C6 glyceryl ether | 0.2 | Copolymer B-1 | 0.2 | 12.7 | D | C | 6.0 |
| | 1-8 | Comparative A-3 | 0.2 | Copolymer C-2 | 0.2 | 12.3 | D | C | 6.2 |
| | 1-9 | — | — | Naphthalene/sulfonic aid/formalin condensate(MW: 15000) | 0.3 | 12.5 | D | C | 5.8 |
| | 1-10 | — | — | Melamine/sulfonic acid/formalin condensate(MW: 20000) | 0.3 | 12.8 | C | C | 5.9 |
| Example | 1-1 | A-7 | 0.2 | Copolymer B-1 | 0.2 | 14.2 | A | A | 6.2 |
| | 1-2 | A-10 | 0.2 | Copolymer B-1 | 0.2 | 13.9 | A | A | 6.1 |
| | 1-3 | A-23 | 0.2 | Copolymer B-1 | 0.2 | 13.7 | A | A | 6.1 |
| | 1-4 | A-23 | 0.2 | Copolymer B-2 | 0.2 | 13.5 | A | A | 5.9 |
| | 1-5 | Glycerin PO1 | 0.2 | Copolymer B-1 | 0.2 | 13.9 | A | A | 6.2 |
| | 1-6 | DEC | 0.2 | Copolymer B-1 | 0.2 | 13.9 | A | A | 6.2 |
| | 1-7 | EG | 0.2 | Copolymer B-1 | 0.2 | 13.5 | A | A | 6.2 |
| | 1-8 | 1,2-butanediol | 0.2 | Copolymer B-1 | 0.2 | 13.7 | B | A | 6.1 |
| | 1-9 | A-10 | 0.2 | Copolymer B-2 | 0.2 | 13.9 | A | A | 6.2 |
| | 1-10 | A-10 | 0.2 | Copolymer B-3 | 0.2 | 13.6 | A | A | 6.1 |
| | 1-11 | A-10 | 0.2 | Copolymer B-4 | 0.2 | 13.9 | A | A | 6.2 |

TABLE 5-continued

|  |  | Component (A) | | Copolymer | | Demolding strength (N/mm²) | Surface texture | Low-foaming property | Mortar viscosity (second) |
|---|---|---|---|---|---|---|---|---|---|
|  |  | Kind | Dosage (wt %) | Kind | Dosage (wt %) |  |  |  |  |
|  | 1-12 | A-10 | 0.2 | Copolymer B-5 | 0.2 | 13.8 | A | A | 6.3 |
|  | 1-13 | A-10 | 0.2 | Copolymer B-6 | 0.2 | 13.8 | A | A | 6.3 |
|  | 1-14 | A-10 | 0.2 | Copolymer B-1/Copolymer B-2 = 3/7 (weight ratio) | 0.2 | 13.9 | A | A | 6.0 |
|  | 1-15 | A-10 | 0.2 | Copolymer B-1/copolymer B-3 = 3/7 (weight ratio) | 0.2 | 13.8 | A | A | 6.0 |
|  | 1-16 | A-10 | 0.2 | Copolymer B-3/copolymer B-4 = 7/3 (weight ratio) | 0.2 | 13.9 | A | A | 6.0 |
|  | 1-17 | A-10 | 0.2 | Copolymer B-1/copolymer B-5 = 3/7 (weight ratio) | 0.2 | 13.9 | A | A | 6.0 |
|  | 1-18 | A-10 | 0.2 | Copolymer B-1/copolymer B-6 = 3/7 (weight ratio) | 0.2 | 13.9 | A | A | 6.0 |
|  | 1-19 | A-23 | 0.2 | Copolymer C-2 | 0.2 | 13.5 | B | A | 6.4 |
|  | 1-20 | A-7 | 0.2 | Naphthalene/sulfonic aid/formalin condensate(MW: 15000) | 0.3 | 13.7 | A | A | 5.9 |
|  | 1-21 | A-7 | 0.2 | Melamine/sulfonic acid/formalin condensate(MW: 20000) | 0.3 | 14.0 | A | A | 6.4 |

TABLE 6

|  |  | Component (A) | | Copolymer | | Demolding strength (N/mm²) | Surface texture | Low-foaming property | Mortar viscosity (second) |
|---|---|---|---|---|---|---|---|---|---|
|  |  | Kind | Dosage (wt %) | Kind | Dosage (wt %) |  |  |  |  |
| Comparative example | 1-11 | 1,3-propanediol | 0.2 | Copolymer B-1 | 0.2 | 12.5 | D | A | 6.2 |
|  | 1-12 | 3-butoxy-1,2-propanediol | 0.2 | Copolymer B-1 | 0.3 | 12.8 | C | C | 6.1 |
| Example | 1-23 | 3-methoxy-1,2-propanediol | 0.2 | Copolymer B-1 | 0.2 | 14.0 | A | A | 6.0 |
|  | 1-24 | 3-ethoxy-1,2-propanediol | 0.2 | Copolymer B-1 | 0.2 | 13.8 | A | A | 6.0 |
|  | 1-25 | 3-propoxy-1,2-propanediol | 0.2 | Copolymer B-1 | 0.2 | 13.5 | A | A | 6.0 |
|  | 1-26 | Mixture (A3-1) | 0.2 | Copolymer B-1 | 0.2 | 13.9 | A | A | 6.0 |

TABLE 7

|  |  | Component (A) | | Component (B) | | Demolding strength (N/mm²) | Surface texture | Low-foaming property | Mortar viscosity (second) |
|---|---|---|---|---|---|---|---|---|---|
|  |  | Kind | Dosage (wt %) | Kind | Dosage (wt %) |  |  |  |  |
| Comparative example | 2-1 | — | — | Copolymer B-1 | 0.2 | 12.7 | D | A | 6.2 |
| Example | 2-1 | A-10 | 0.010 | Copolymer B-1 | 0.2 | 13.5 | A | A | 6.2 |
|  | 2-2 | A-10 | 0.050 | Copolymer B-1 | 0.2 | 13.8 | A | A | 6.2 |
|  | 2-3 | A-10 | 0.200 | Copolymer B-1 | 0.2 | 13.9 | A | A | 6.1 |
|  | 2-4 | A-10 | 0.300 | Copolymer B-1 | 0.2 | 14.0 | A | A | 6.1 |
|  | 2-5 | A-10 | 0.500 | Copolymer B-1 | 0.2 | 13.9 | A | A | 6.1 |
|  | 2-6 | A-10 | 1.000 | Copolymer B-1 | 0.2 | 13.6 | B | B | 5.9 |

TABLE 8

|  |  | Component (A) | | Component (B) | | Component (C) | | Demolding strength (N/mm²) | Surface texture | Low-foaming property | Mortar viscosity (second) |
|---|---|---|---|---|---|---|---|---|---|---|---|
|  |  | Kind | Dosage (wt %) | Kind | Dosage (wt %) | Kind | Dosage (wt %) |  |  |  |  |
| Example | 3-1 | A-7 | 0.02 | Copolymer B-2 | 0.12 | Copolymer C-1 | 0.06 | 13.5 | B | A | 6.4 |
|  | 3-2 | A-7 | 0.40 | Copolymer B-2 | 0.1 | Copolymer C-1 | 0.06 | 14.6 | A | A | 6.4 |
|  | 3-3 | A-7 | 0.30 | Copolymer B-2 | 0.18 | Copolymer C-1 | 0.06 | 14.3 | A | A | 6.2 |
|  | 3-4 | A-7 | 0.20 | Copolymer B-2 | 0.24 | Copolymer C-1 | 0.02 | 14.1 | A | A | 5.9 |
|  | 3-5 | A-7 | 0.01 | Copolymer B-2 | 0.14 | Copolymer C-2 | 0.1 | 13.2 | B | A | 6.2 |
|  | 3-6 | A-7 | 0.10 | Copolymer B-2 | 0.1 | Copolymer C-2 | 0.06 | 13.8 | A | A | 6.3 |

TABLE 9

|  |  | Component (A) | | Component (B) | | Demolding strength (N/mm²) | Surface texture | Low-foaming property | Mortar viscosity (second) |
|---|---|---|---|---|---|---|---|---|---|
|  |  | Kind | Dosage (wt %) | Kind | Dosage (wt %) |  |  |  |  |
| Comparative example | 4-1 | — | — | Copolymer B-2 | 0.2 | 12.0 | D | A | 7.2 |
|  | 4-2 | Comparative A-1 | 0.2 | Copolymer B-2 | 0.2 | 11.6 | D | A | 7.5 |
|  | 4-3 | Comparative A-2 | 0.2 | Copolymer B-2 | 0.2 | 11.9 | D | A | 7.0 |
|  | 4-4 | Comparative A-3 | 0.2 | Copolymer B-2 | 0.2 | 12.1 | D | C | 6.2 |
| Example | 4-1 | A-1 | 0.2 | Copolymer B-2 | 0.2 | 12.6 | B | A | 6.4 |
|  | 4-2 | A-2 | 0.2 | Copolymer B-2 | 0.2 | 12.9 | B | B | 6.6 |
|  | 4-3 | A-3 | 0.2 | Copolymer B-2 | 0.2 | 12.8 | B | B | 6.3 |
|  | 4-4 | A-4 | 0.2 | Copolymer B-2 | 0.2 | 13.3 | B | A | 6.5 |
|  | 4-5 | A-5 | 0.2 | Copolymer B-2 | 0.2 | 13.4 | B | A | 6.6 |
|  | 4-6 | A-6 | 0.2 | Copolymer B-2 | 0.2 | 13.7 | A | A | 6.5 |
|  | 4-7 | A-7 | 0.2 | Copolymer B-2 | 0.2 | 13.9 | A | A | 6.5 |
|  | 4-8 | A-8 | 0.2 | Copolymer B-2 | 0.2 | 14.2 | A | A | 6.4 |
|  | 4-9 | A-9 | 0.2 | Copolymer B-2 | 0.2 | 14.1 | A | A | 6.3 |
|  | 4-10 | A-10 | 0.2 | Copolymer B-2 | 0.2 | 13.9 | A | A | 6.2 |
|  | 4-11 | A-11 | 0.2 | Copolymer B-2 | 0.2 | 13.4 | B | A | 6.2 |
|  | 4-12 | A-12 | 0.2 | Copolymer B-2 | 0.2 | 13.8 | A | A | 6.3 |
|  | 4-13 | A-13 | 0.2 | Copolymer B-2 | 0.2 | 14.2 | A | A | 6.4 |
|  | 4-14 | A-14 | 0.2 | Copolymer B-2 | 0.2 | 13.6 | A | A | 6.3 |
|  | 4-15 | A-15 | 0.2 | Copolymer B-2 | 0.2 | 13.6 | A | A | 6.3 |
|  | 4-16 | A-16 | 0.2 | Copolymer B-2 | 0.2 | 13.8 | A | A | 6.3 |
|  | 4-17 | A-17 | 0.2 | Copolymer B-2 | 0.2 | 14.1 | A | A | 6.2 |
|  | 4-18 | A-18 | 0.2 | Copolymer B-2 | 0.2 | 13.9 | A | A | 6.5 |
|  | 4-19 | A-19 | 0.2 | Copolymer B-2 | 0.2 | 13.8 | A | A | 6.4 |
|  | 4-20 | A-20 | 0.2 | Copolymer B-2 | 0.2 | 14.0 | A | A | 6.3 |
|  | 4-21 | A-21 | 0.2 | Copolymer B-2 | 0.2 | 13.9 | A | A | 6.3 |
|  | 4-22 | A-22 | 0.2 | Copolymer B-2 | 0.2 | 13.5 | B | A | 6.3 |

In the tables, the amount of each component added is the amount (weight %) of the effective component relative to the weight of cement. For descriptive purposes, compounds not corresponding to the component (B) are also indicated in the column. In the component (A), other compounds are as follows:

Glycerin PO1: Glycerin/propylene oxide adduct having 1 mole on average of glycerin added to glycerin, obtained in Production Example 2

DEG: diethylene glycol (reagent (purity 99%) manufactured by Wako Pure Chemical Industries, Ltd.)

EG: ethylene glycol (reagent (purity 99%) manufactured by Wako Pure Chemical Industries, Ltd.)

1,2-Butanediol (first-grade reagent manufactured by Wako Pure Chemical Industries, Ltd.)

Butanol (first-grade reagent manufactured by Wako Pure Chemical Industries, Ltd.)

1,3-Butanediol (first-grade reagent manufactured by Wako Pure Chemical Industries, Ltd.)

Butyl diglycol (manufactured by Nippon Nyukazai Co., Ltd.)

C6 glyceryl ether: hexyl glyceryl ether obtained in Comparative Production Example 1

3-Methoxy-1,2-propanediol (purity: 97%, manufactured by Tokyo Kasei Kogyo Co., Ltd.)

3-Ethoxy-1,2-propanediol (purity: 97%, manufactured by Tokyo Kasei Kogyo Co., Ltd.)

1,3-Propanediol (first-grade reagent manufactured by Wako Pure Chemical Industries, Ltd.)

Glycerin (manufactured by Kao Corporation)

The invention claimed is:

1. An early strengthening agent for a hydraulic composition, comprising one or more compounds (A) selected from the group consisting of:

a compound represented by the following general formula (A1):

wherein R represents a hydrogen atom, a methyl group or an ethyl group, and Z represents —OH or —O—CH₂CH₂—OH, a compound represented by the following general formula (A2):

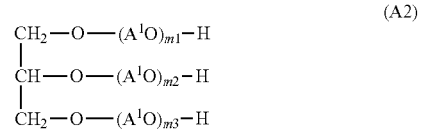

wherein $A^1$ represents an alkylene group having 2 carbon atoms, m1, m2 and m3 each represent an integer indicating the number of moles of $A^1O$ added and the average of the sum in total of m1, m2 and m3 in the compound represented by the general formula (A2) is 0.5 to 2.5, the compound represented by the general formula (A2) comprises an adduct of 1 mole of ethylene oxide, an adduct of 2 moles of ethylene oxide, and an adduct of 3 moles of ethylene oxide in a total amount of 43% by weight of more, wherein an amount of the adduct of 1 mole of ethylene oxide is 15 to 100% by weight, and a compound represented by the following general formula (A3):

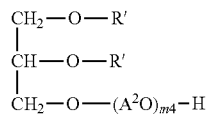
(A3)

wherein R's are the same as or different from one another and each represent a hydrogen atom or a group selected from the group consisting of a methyl group, an ethyl group and a propyl group, at least one of R's is group selected from the group consisting of a methyl group, an ethyl group and a propyl group; and $A^2$ represents an alkylene group having 2 carbon atoms, and m4 is a number of 0 to 2 that is the average number of moles of $A^2O$ added.

2. An additive composition for a hydraulic composition, comprising:

the early strengthening agent of claim 1, and a phosphate polymer (B), obtained by copolymerizing, at pH 7 or less, a monomer 1 represented by the following general formula (B1):

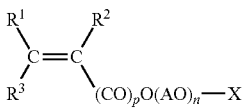
(B1)

wherein $R^1$ and $R^2$ each independently represent a hydrogen atom or a methyl group, $R^3$ represents a hydrogen atom or —COO(AO)$_n$X, AO represents a oxyalkylene group having 2 to 4 carbon atoms or an oxystyrene group, p is a number of 0 or 1, n is a number of 3 to 200 indicating the average number of moles of AO added, and X represents a hydrogen atom or an alkyl group having 1 to 18 carbon atoms, a monomer 2 represented by the following general formula (B2):

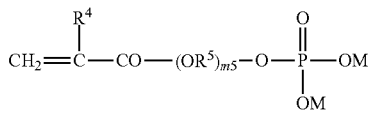
(B2)

wherein $R^4$ represent a hydrogen atom or a methyl group, $R^5$ represents an alkylene group having 2 to 12 carbon atoms, m5 represents a number of 1 to 30, and M represents a hydrogen atom, an alkali metal or an alkaline earth metal (½ atom), and a monomer 3 represented by the following general formula (B3):

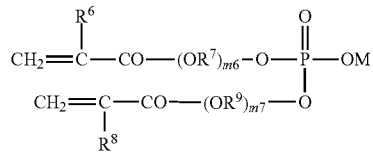
(B3)

wherein $R^6$ and $R^8$ each independently represent a hydrogen atom or a methyl group, $R^7$ and $R^9$ each independently represent an alkylene group having 2 to 12 carbon atoms, m6 and m7 each independently represent a number of 1 to 30, and M represents a hydrogen atom, an alkali metal or an alkaline earth metal (½ atom).

3. An additive composition for a hydraulic composition according to claim 2, wherein a weight ratio of the total amount of the component (B) to the total amount of the component (A), that is, (13)/(A) is 1/585 to 96/4.

4. An additive composition for a hydraulic composition according to claim 2, which further comprises a copolymer (C) comprising, as constituent units, a monomer (a) represented by the following general formula (C1-1) and a monomer (b) selected from the group consisting of a monomer represented by the following general formula (C1-2) and a monomer represented by the following general formula (C1-3):

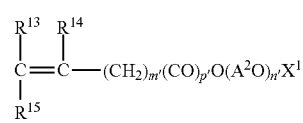
(C1-1)

wherein:

$R^{13}$, $R^{14}$: a hydrogen atom or —CH$_3$, $R^{15}$: a hydrogen atom or —COO(AO)$_n$X, $A^2$: an alkylene group having 2 to 4, $X^1$: a hydrogen atom or an alkyl group having 1 to 18 carbon atoms, m': a number of 0 to 2, n': a number of 2 to 300, and p': a number of 0 or 1; and

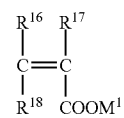
(C1-2)

wherein:

$R^{16}$, $R^{17}$, $R^{18}$ may be the same as or different from one another and each represent a hydrogen atom, CH$_3$ or (CH$_2$)$_r$COOM$^2$, and (CH$_2$)$_r$COOM$^2$ may, together with COOM$^1$ or another (CH$_2$)$_r$COOM$^2$, form an anhydride wherein M$^1$ and M$^2$ in the above groups do not exist, M$^1$, M$^2$: a hydrogen atom, an alkali metal, an alkaline earth metal (½ atom), an ammonium group, an alkyl ammonium group or a substituted alkyl ammonium group, and r: a number of 0 to 2;

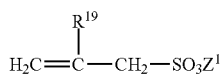
(C1-3)

wherein:

$R^{19}$: a hydrogen atom or —$CH_3$, and $Z^1$: a hydrogen atom, an alkali metal, an alkaline earth metal (½ atom), an ammonium group, an alkyl ammonium group or a substituted alkyl ammonium group.

5. An additive composition for a hydraulic composition according to claim 4, wherein the weight ratio of the phosphate polymer (B) to the copolymer (C), (B)/(C), is 100/1 to 100/80.

6. A hydraulic composition, comprising the early strengthening agent for a hydraulic composition according to claim 1, a hydraulic powder, aggregates and water.

7. A hydraulic composition, comprising the additive composition for a hydraulic composition according to claim 2, a hydraulic powder, aggregates and water.

8. A hydraulic composition according to claim 7, which comprises the compound (A) and the phosphate polymer (B) in the total amount of 0.1 to 10% by weight based on the hydraulic powder.

9. An additive composition for a hydraulic composition according to claim 2, which further comprises an antifoaming agent of dimethylpolysiloxane or polyalkylene glycol fatty acid ester.

10. The early strengthening agent for a hydraulic composition according to claim 1, wherein the compound represented by the general formula (A2) contains the adduct of 1 mole of ethylene oxide, the adduct of 2 moles of ethylene oxide, and the adduct of 3 moles of ethylene oxide in the total amount of 60 to 100% by weight, and the adduct of 1 mole of ethylene oxide in the amount of 20 to 100% by weight.

* * * * *